(12) United States Patent
Eslami

(10) Patent No.: US 9,357,232 B2
(45) Date of Patent: May 31, 2016

(54) IMAGE PROCESSING SYSTEM WITH BINARY DECOMPOSITION AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/525,474

(22) Filed: Oct. 28, 2014

(65) Prior Publication Data

US 2016/0119646 A1    Apr. 28, 2016

(51) Int. Cl.
| | |
|---|---|
| G06K 9/36 | (2006.01) |
| H04N 19/63 | (2014.01) |
| H04N 19/176 | (2014.01) |
| H04N 19/18 | (2014.01) |

(52) U.S. Cl.
CPC ............. *H04N 19/63* (2014.11); *H04N 19/176* (2014.11); *H04N 19/18* (2014.11)

(58) Field of Classification Search
None
See application file for complete search history.

(56) References Cited

U.S. PATENT DOCUMENTS

| | | | |
|---|---|---|---|
| 6,154,493 A | 11/2000 | Acharya et al. | |
| 6,272,180 B1 | 8/2001 | Lei | |
| 6,356,665 B1 | 3/2002 | Lei et al. | |
| 6,546,143 B1 | 4/2003 | Taubman et al. | |
| 6,549,666 B1 * | 4/2003 | Schwartz | G06F 17/148 375/E7.016 |
| 6,801,665 B1 * | 10/2004 | Atsumi | H04N 19/70 375/E7.056 |
| 6,865,291 B1 | 3/2005 | Zador | |
| 6,965,700 B2 | 11/2005 | Pearlman et al. | |
| 7,006,697 B1 | 2/2006 | Gormish et al. | |
| 7,120,307 B2 | 10/2006 | Malvar | |
| 7,142,722 B2 | 11/2006 | Fukuhara et al. | |
| 7,248,735 B2 | 7/2007 | Funakubo | |
| 7,308,402 B2 | 12/2007 | Zhou et al. | |
| 7,315,651 B2 | 1/2008 | Sakuyama et al. | |
| 7,376,279 B2 | 5/2008 | Dekel et al. | |
| 7,397,963 B2 | 7/2008 | Schwartz | |
| 7,412,102 B2 | 8/2008 | Srinivasan et al. | |
| 7,421,137 B2 | 9/2008 | Taubman | |
| 7,454,074 B2 | 11/2008 | Dekel et al. | |
| 7,492,955 B2 | 2/2009 | Zandi et al. | |

(Continued)

FOREIGN PATENT DOCUMENTS

WO    WO-0049571 A2    8/2000

OTHER PUBLICATIONS

U.S. Appl. No. 14/525,364, filed Oct. 28, 2014, Eslami.

(Continued)

*Primary Examiner* — Li Liu
(74) *Attorney, Agent, or Firm* — Haverstock & Owens LLP

(57) ABSTRACT

An image processing system, and a method of operation thereof, includes: a pre-processing module for receiving a raw image block of a source image from an imaging device; a wavelet transform module, coupled to the pre-processing module, for forming a wavelet coefficient block by performing a wavelet transform operation on the raw image block; and an encoding module, coupled to the wavelet transform module, for initializing a region significance vector based on the wavelet coefficient block, for generating a code value based on the region significance vector at an index position of a bit region in a wavelet bitplane of the wavelet coefficient block, for forming an encoded block based on the code value, and for generating a bitstream based on the encoded block for decoding into a display image to display on a display device.

20 Claims, 14 Drawing Sheets

(56) References Cited

U.S. PATENT DOCUMENTS

| | | |
|---|---|---|
| 7,545,988 B2 | 6/2009 | Meeker |
| 7,574,056 B2 | 8/2009 | Funakubo et al. |
| 7,623,577 B2 | 11/2009 | Kim et al. |
| 7,634,145 B2 | 12/2009 | Keith et al. |
| 7,656,561 B2 | 2/2010 | Molgaard et al. |
| 7,949,044 B2 | 5/2011 | Winger et al. |
| 8,265,334 B2 | 9/2012 | Yoo et al. |
| 8,306,340 B2 | 11/2012 | Ceperkovic et al. |
| 8,351,693 B2 | 1/2013 | Hayashi |
| 8,401,082 B2 | 3/2013 | Ye et al. |
| 8,428,379 B2 | 4/2013 | Rane et al. |
| 8,446,947 B2 | 5/2013 | Yu et al. |
| 8,588,536 B2 | 11/2013 | Dikbas et al. |
| 8,861,879 B2 | 10/2014 | Park et al. |
| 2001/0024530 A1* | 9/2001 | Fukuhara ............. H04N 19/176 382/240 |
| 2002/0003905 A1* | 1/2002 | Sato ..................... G06T 5/10 382/240 |
| 2002/0118759 A1* | 8/2002 | Enficiaud ............. H04N 19/70 375/240.19 |
| 2003/0063809 A1 | 4/2003 | Andrew |
| 2003/0123742 A1 | 7/2003 | Zhao et al. |
| 2003/0190042 A1* | 10/2003 | Tagashira ....... H04N 21/234327 380/45 |
| 2005/0131660 A1 | 6/2005 | Yadegar et al. |
| 2006/0034525 A1* | 2/2006 | Sakai ..................... H04N 19/64 382/232 |
| 2006/0159355 A1* | 7/2006 | Mizuno ................ H04N 19/147 382/239 |
| 2008/0253463 A1 | 10/2008 | Lin et al. |
| 2010/0046628 A1 | 2/2010 | Bhaskaran et al. |
| 2010/0085224 A1* | 4/2010 | Monro ................ H03M 7/3082 341/107 |
| 2011/0229047 A1* | 9/2011 | Shimauchi ............. H04N 19/91 382/233 |
| 2011/0292247 A1 | 12/2011 | Gharavi-Alkhansan et al. |
| 2012/0200669 A1 | 8/2012 | Lai et al. |
| 2012/0307904 A1 | 12/2012 | Yi et al. |
| 2014/0169693 A1 | 6/2014 | Kuo et al. |

OTHER PUBLICATIONS

U.S. Appl. No. 14/525,524, filed Oct. 28, 2014, Eslami.
U.S. Appl. No. 14/525,556, filed Oct. 28, 2014, Eslami.
U.S. Appl. No. 14/525,611, filed Oct. 28, 2014, Eslami.
U.S. Appl. No. 14/525,657, filed Oct. 28, 2014, Eslami.
U.S. Appl. No. 14/526,120, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, IEEE.

* cited by examiner

IMAGE PROCESSING SYSTEM WITH BINARY DECOMPOSITION AND METHOD OF OPERATION THEREOF

CROSS-REFERENCE TO RELATED APPLICATION(S)

The present application contains subject matter related to concurrently filed U.S. patent application Ser. No. 14/525,364. The related application is assigned to Sony Corporation and the subject matter thereof is incorporated herein by reference thereto.

The present application contains subject matter related to concurrently filed U.S. patent application Ser. No. 14/525,524. The related application is assigned to Sony Corporation and the subject matter thereof is incorporated herein by reference thereto.

The present application contains subject matter related to concurrently filed U.S. patent application Ser. No. 14/525,556. The related application is assigned to Sony Corporation and the subject matter thereof is incorporated herein by reference thereto.

The present application contains subject matter related to a-concurrently filed U.S. patent application Ser. No. 14/525,611. The related application is assigned to Sony Corporation and the subject matter thereof is incorporated herein by reference thereto.

The present application contains subject matter related to concurrently filed U.S. patent application Ser. No. 14/525,657. The related application is assigned to Sony Corporation and the subject matter thereof is incorporated herein by reference thereto.

The present application contains subject matter related to concurrently filed U.S. patent application Ser. No. 14/526,120. The related application is assigned to Sony Corporation and the subject matter thereof is incorporated herein by reference thereto.

TECHNICAL FIELD

The embodiments of the present invention relate generally to an image processing system and more particularly to a system for lossless compression.

BACKGROUND ART

Modern consumer and industrial electronics, especially devices with a graphical imaging capability, such as cameras, televisions, projectors, cellular phones, and combination devices, are providing increasing levels of functionality to support modern life, which require capturing and managing digital image information. Larger image format sizes and recording speeds require ever-larger amounts of information to be digitally stored on digital media to capture images and video recordings. Research and development in the existing technologies can take a myriad of different directions.

As users become more empowered with the growth of imaging devices, new and old paradigms begin to take advantage of this new device space. There are many technological solutions to take advantage of this new imaging opportunity. One existing approach is to capture and display images on consumer, industrial, and mobile electronics such as digital cameras, smart phones with imaging capability, digital projectors, televisions, monitors, gaming systems, video cameras, or a combination devices.

Image capture and display systems have been incorporated in cameras, phones, projectors, televisions, notebooks, and other portable products. Today, these systems aid users by capturing and displaying available relevant information, such as images, graphics, text, or videos. The capture and display of digital images provides invaluable relevant information.

However, capturing, managing, and displaying information in digital images has become a paramount concern for the consumer. Mobile systems must store larger amounts of digital image information in smaller physical storage spaces. Limiting the capture of digital images decreases the benefit of using the tools.

Thus, a need still remains for better image processing system to capture and display digital images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of an image processing system including: receiving a raw image block of a source image from an imaging device; forming a wavelet coefficient block by performing a wavelet transform operation on the raw image block; initializing a region significance vector based on the wavelet coefficient block; generating a code value based on the region significance vector at an index position of a bit region in a wavelet bitplane of the wavelet coefficient block; forming an encoded block based on the code value; and generating a bitstream based on the encoded block for decoding into a display image to display on a display device.

Embodiments of the present invention provide an image processing system, including: a pre-processing module for receiving a raw image block of a source image from an imaging device; a wavelet transform module, coupled to the pre-processing module, for forming a wavelet coefficient block by performing a wavelet transform operation on the raw image block; an encoding module, coupled to the wavelet transform module, for initializing a region significance vector based on the wavelet coefficient block, for generating a code value based on the region significance vector at an index position of a bit region in a wavelet bitplane of the wavelet coefficient block, for forming an encoded block based on the code value, and for generating a bitstream based on the encoded block for decoding into a display image to display on a display device.

Certain embodiments of the invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

Figure 1:
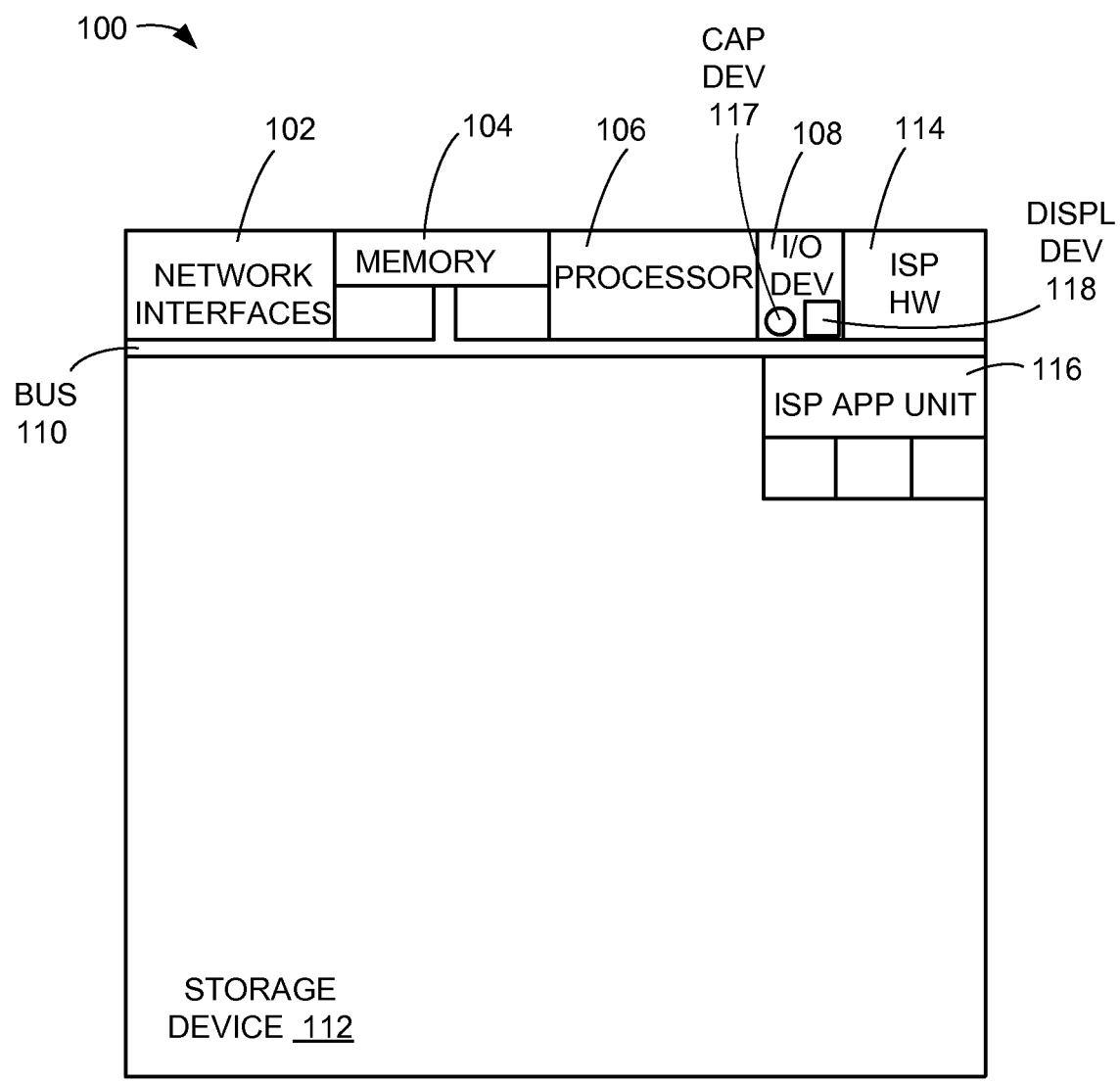
FIG. 1 is an example of a hardware block diagram of an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

The term "module" referred to herein can include software, hardware, or a combination thereof in embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown an example of a hardware block diagram of an image processing system 100 in an embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units for processing images including dedicated circuitry, a processor, an integrated circuit, and integrated circuit cores. The image signal processing application unit 116 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-Shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture device 117. For example, the capture device 117 can be used to capture video. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projections, CRT, or other display technologies.

The video captured by the capture device 117 can be considered as a series of images, which can further be broken down into input image blocks, for example. The capture device 117 is shown as connected to the processor 106 and the image signal processing hardware 114, but it is understood that the capture device 117 can be separate from the processor 106. In addition, the processor 106 can be physically separate from the display devices 118. The capture device 117, the processor 106, and the display devices 118 can all be connected physically or wirelessly, through the network interfaces 102, for example, as required by usage patterns.

For example, the capture device 117 can be a video camera capable of a wired or wireless connection to a display device having the processor 106 and the display devices 118. As another example, the capture device 117 and certain subunits of the image signal processing hardware 114 can be contained within a camera capable of wired or wireless connection to a display device having the remaining subunits of the image signal processing hardware 114 and the display devices 118, which can display resulting video.

Regardless of how the capture device 117, the processor 106, and the display devices 118 are connected, the display devices 118 can output decoded image blocks as decoded video after processing of the input image blocks by the image signal processing hardware 114. The quality of the resulting video can be determined by the particular compression scheme used when transmitting image block data, for example.

The image processing system 100 can include a system with a low-complexity embedded wavelet coder using a binary decomposition of bitplanes. In the embodiments of the present invention, a wavelet-based embedded coder-decoder (codec) with low complexity is proposed. The proposed codec works on one-dimensional (1-D) luminance-chroma (YUV) image blocks. The proposed codec is based on bit-plane coding in a wavelet domain through grouping zeroes together and coding them with short codes.

Then, non-zero partitions of size 4 bits are coded using variable-length code (VLC) tables for luma and chroma components. This codec has been optimized for small 1-D blocks to be implemented in hardware including large-scale integration (LSI) components.

The image processing system 100 can be applied to image codec, image processing, or video processing. For example, the image processing system 100 can be implemented for 4K televisions (TV). As a specific example, the image processing system 100 can be implemented in Sony BRAVIA™ LCD TVs, Sony digital still cameras (DSC), or Sony Handycam camcorders.

The embodiments of the present invention include a low-complexity coding algorithm that provides visually lossless compression for images and videos in order to reduce bandwidths demands of various image processing modules and memory. It can be implemented in LSI as a module in system on a chip (SOC).

There is another wavelet-based approach developed in Sony products, which is optimized only at low compression ratios of 50% or 4 bits/sample (bps) for 8-bit input images. The proposed codec, however, provides more efficient performance at higher compression ratios or target rates lower than 4 bps, compared to differential pulse-code modulation (DPCM) based approach only at low compression rates of 50% or lower.

The low-complexity coding algorithm can be implemented in LSI for memory and bus bandwidth reduction in electronic devices that work with digital images and videos. For example, the electronic devices can include digital still images, video cameras, TVs, cellphones, and High-Definition Multimedia Interface (HDMI) or Mobile High-Definition Link (MHL) standards.

Figure 2:
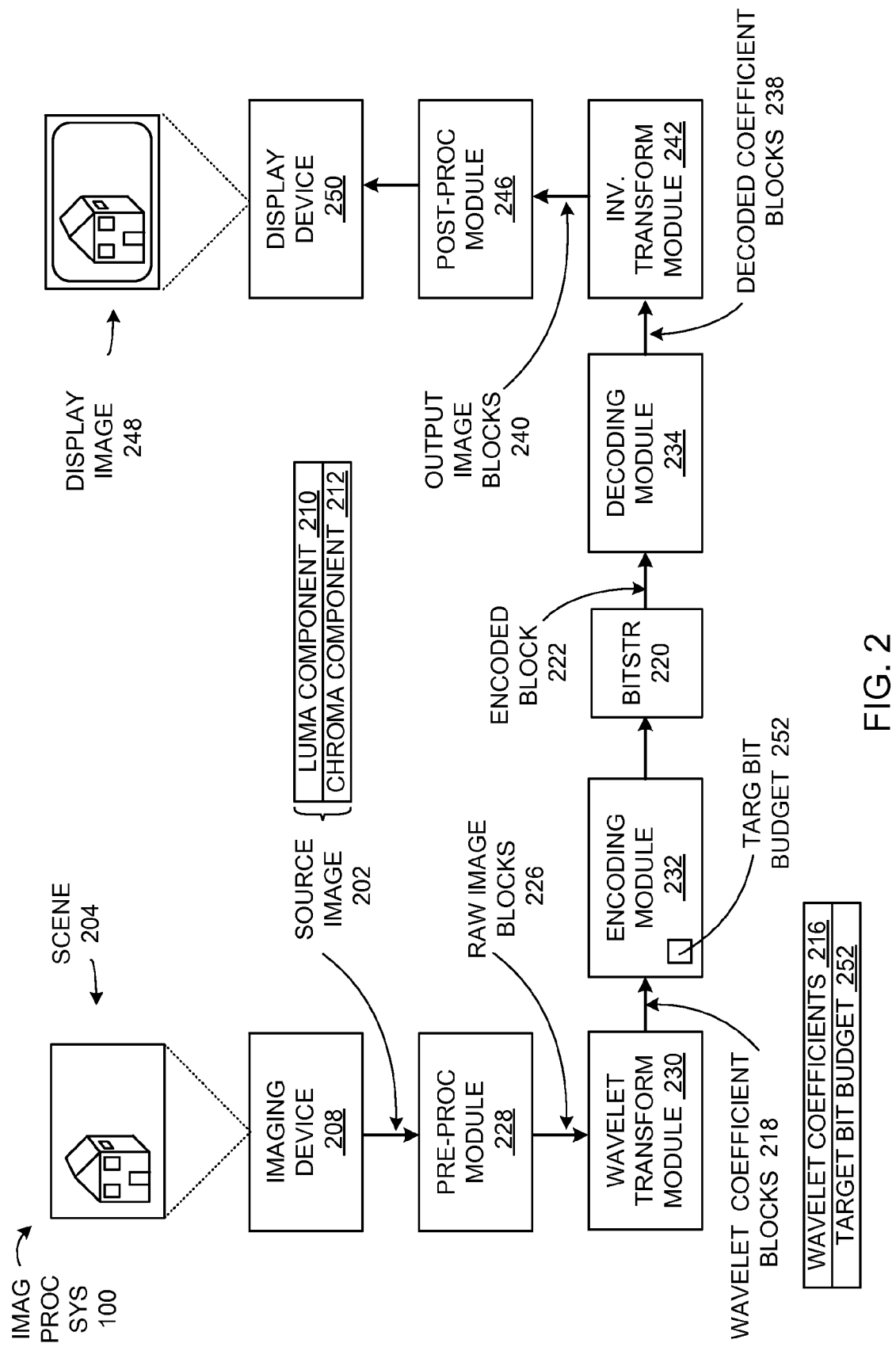
FIG. 2 is a functional block diagram of the image processing system.

Referring now to FIG. 2, therein is shown a functional block diagram of the image processing system 100. The image processing system 100 can encode and decode image information.

An imaging device 208 can form a source image 202 from a scene 204. The imaging device 208 is a device for capturing image data to form the source image 202.

The source image 202 is a digital representation of the scene 204. The source image 202 can be a digital image. The source image 202 can be formatted with a color model such as luminance-chroma (YUV), Red-Green-Blue (RGB), Cyan-Magenta-Yellow-Key (CMYK), or a similar color model.

For example, the source image 202 can be represented using the YUV color model. The source image 202 can have a luma component 210 and a chroma component 212, such as a first chroma component and a second chroma component.

A pre-processing module 228 can partition the source image 202 into raw image blocks 226 for easier processing. Each of the raw image blocks 226 can be extracted from the source image 202. The raw image blocks 226 form a subset of the source image 202. For example, the raw image blocks 226 can be a 2-dimensional 32×1 groups of pixels.

The raw image blocks 226 can be extracted from the source image 202 in a non-sequential manner. The raw image blocks 226 of the source image 202 can be accessed and processed in a random access manner because each of the raw image blocks 226 is processed independently.

A wavelet transform module 230 can apply a transform to each of the raw image blocks 226. For example, the wavelet transform module 230 can perform a wavelet transform, such as a Daubechies 5/3 integer wavelet transform, on each of the raw image blocks 226 to calculate wavelet coefficients 216 to form wavelet coefficient blocks 218. The wavelet coefficient blocks 218 are the binary representation of the wavelet coefficients 216 representing a wavelet transform of the raw image blocks 226.

An encoding module 232 can receive and encode the wavelet coefficient blocks 218 to form an encoded block 222 for a bitstream 220. The encoded block 222 is computationally modified data representing one of the wavelet coefficient blocks 218. The bitstream 220 is a digital representation of the wavelet coefficient blocks 218 of the source image 202.

Encoding is defined as computationally modifying a representation of an image to a different form. For example, encoding can compress the wavelet coefficient blocks 218 into the encoded block 222 for inserting into the bitstream 220 to reduce the amount of data needed to transmit the source image 202.

The encoding module 232 can encode the source image 202 to form the encoded block 222 by compressing the wavelet coefficient blocks 218. For example, the bitstream 220 can be a bit sequence having the encoded block 222 and representing a compression of the source image 202.

The encoding module 232 can be implemented in a variety of ways. For example, the encoding module 232 can be implemented using hardware, software, or a combination thereof. For example, the encoding module 232 can be implemented with custom circuitry, a digital signal processor, microprocessor, integrated circuits, or a combination thereof.

The encoding process can be configured with a target bit budget 252. The target bit budget 252 is a number of bits allowed for the compressed version of the wavelet coefficient blocks 218. For example, if the target bit rate for transmission to the bitstream 220 is 4 bits per sample, then the target bit budget 252 can be 32 times 4 for 128 bits for a one-color block of size 32×1. If the wavelet coefficient blocks 218 have an 8-bit depth, then this is equivalent to a 50% compression ratio.

In an illustrative example, the bitstream 220 can be a serial bitstream sent from the encoding module 232 to a decoding module 234. In another illustrative example, the bitstream 220 can be a data file stored on a storage device and retrieved for use by the decoding module 234.

In an illustrative example, the bitstream 220 can be a serial bitstream sent from the encoding module 232 to a further module. Alternatively, the bitstream 220 can be stored as a digital file on a storage device for decoding at a later time.

The decoding module 234 can receive and decode the bitstream 220 to form decoded coefficient blocks 238. The decoded coefficient blocks 238 are a representation of the wavelet coefficient blocks 218.

The decoding module 234 can extract the encoded block 222 from the bitstream 220 and form the decoded coefficient blocks 238. Decoding is defined as computationally modifying the bitstream 220 to form the decoded coefficient blocks 238.

The decoding module 234 can be implemented in a variety of ways. For example, the decoding module 234 can be implemented using hardware, software, or a combination thereof. For example, the decoding module 234 can be implemented with custom circuitry, a digital signal processor, microprocessor, integrated circuits, or a combination thereof.

An inverse transform module 242 can receive the decoded coefficient blocks 238 and apply an inverse wavelet transform operation to form output image blocks 240. The inverse wavelet transform operation can convert the wavelet coefficients 216 back into the output image blocks 240. The output image blocks 240 are representations of the raw image blocks 226 of the source image 202 after the wavelet transformation, coding, decoding, and inverse wavelet transformation.

A post processing module 246 can receive the output image blocks 240 from the inverse transform module 242 for assembly into a display image 248. The display image 248 is a representation of the source image 202. For example, the post processing module 246 can receive the output image blocks 240, such as 32×1 groups of pixels, and combine them in order to form the display image 248.

A display device 250 can receive the display image 248 from the post processing module 246 for presentation on a display device. For example, the display device 250 can present the display image 248 on a monitor, a flat panel display, a television screen, a camera display, a smart phone, or a similar display device.

The modules can be implemented in hardware or software. For example, the modules can be implemented as electronic circuitry, such as integrated circuits, discrete circuit, or a combination thereof. In another example, the modules can be implemented in software, such as software running on a dedicated processor, a microprocessor, co-processor, or a combination thereof.

The imaging device 208 can be implemented using the network interfaces 102 of FIG. 1, the memory 104 of FIG. 1, the processor 106 of FIG. 1, the input/output devices 108 of FIG. 1, the bus 110 of FIG. 1, the storage device 112 of FIG. 1, the image signal processing hardware 114 of FIG. 1, the image signal processing application unit 116 of FIG. 1, the capture device 117 of FIG. 1, or a combination thereof. The pre-processing module 228 or the wavelet transform module 230 can be implemented using the network interfaces 102, the memory 104, the processor 106, the input/output devices 108, the bus 110, the storage device 112, the image signal processing hardware 114, the image signal processing application unit 116, or a combination thereof.

The encoding module 232 or the decoding module 234 can be implemented using the network interfaces 102, the memory 104, the processor 106, the input/output devices 108, the bus 110, the storage device 112, the image signal processing hardware 114, the image signal processing application unit 116, or a combination thereof. The inverse transform module 242, the post processing module 246, or the display device 250 can be implemented using the network interfaces 102, the memory 104, the processor 106, the input/output devices 108, the bus 110, the storage device 112, the image signal processing hardware 114, the image signal processing application unit 116, or a combination thereof.

The imaging device 208 can be coupled to the pre-processing module 228. The pre-processing module 228 can be coupled to the wavelet transform module 230. The wavelet transform module 230 can be coupled to the encoding module 232. The encoding module 232 can be coupled to the decoding module 234. The decoding module 234 can be coupled to the inverse transform module 242. The inverse transform module 242 can be coupled to the post processing module 246. The post processing module 246 can be coupled to the display device 250.

It has been discovered that accessing the raw image blocks 226 of the source image 202 in a random access manner increases flexibility and computational performance. Because each of the raw image blocks 226 is coded independently of other blocks, there are no limitations on data access and computational parallelism.

Figure 3:
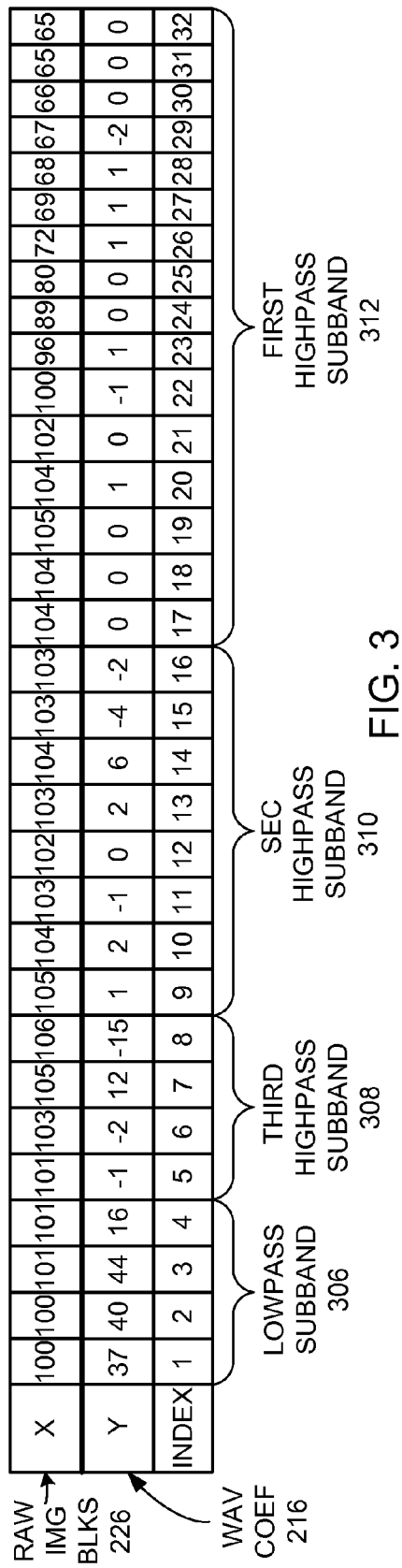
FIG. 3 is an example of the wavelet coefficients.

Referring now to FIG. 3, therein is shown an example of the wavelet coefficients 216. The wavelet coefficients 216 form a representation of one of the raw image blocks 226 of the source image 202 of FIG. 2.

The wavelet coefficients 216 can be calculated by performing a wavelet transform on each of the pixel values of one of the raw image blocks 226. The wavelet coefficients 216 can represent time and frequency transforms of the raw image blocks 226.

In an illustrative example, one of the raw image blocks 226 can be represented by the values denoted by "x". There is one of the x values for each of the 32 pixels of each of the raw image blocks 226.

The wavelet coefficients 216 can be calculated by applying the wavelet transform operation on the x values of the raw image blocks 226. The pixels of the raw image blocks 226 can be represented by 32 of the wavelet coefficients 216.

For example, at each level of the Daubechies 5/3 integer wavelet transform, lowpass ($Y_L$) and highpass ($Y_H$) subbands can be calculated with:

$$Y[2i] = X[2i] - \left\lfloor \frac{X[2i-1] + X[2i+1]}{2} \right\rfloor \quad (1)$$

for $$0 \leq i \leq 16$$

$$Y_H = Y[2i+1] = X[2i+1] + \left\lfloor \frac{Y[2i] + Y[2i+2] + 2}{4} \right\rfloor \quad (2)$$

for $$0 \leq i \leq 15$$

$$Y_L = Y[2i]|_{i=1,\ldots,15} \quad (3)$$

Figure 16:
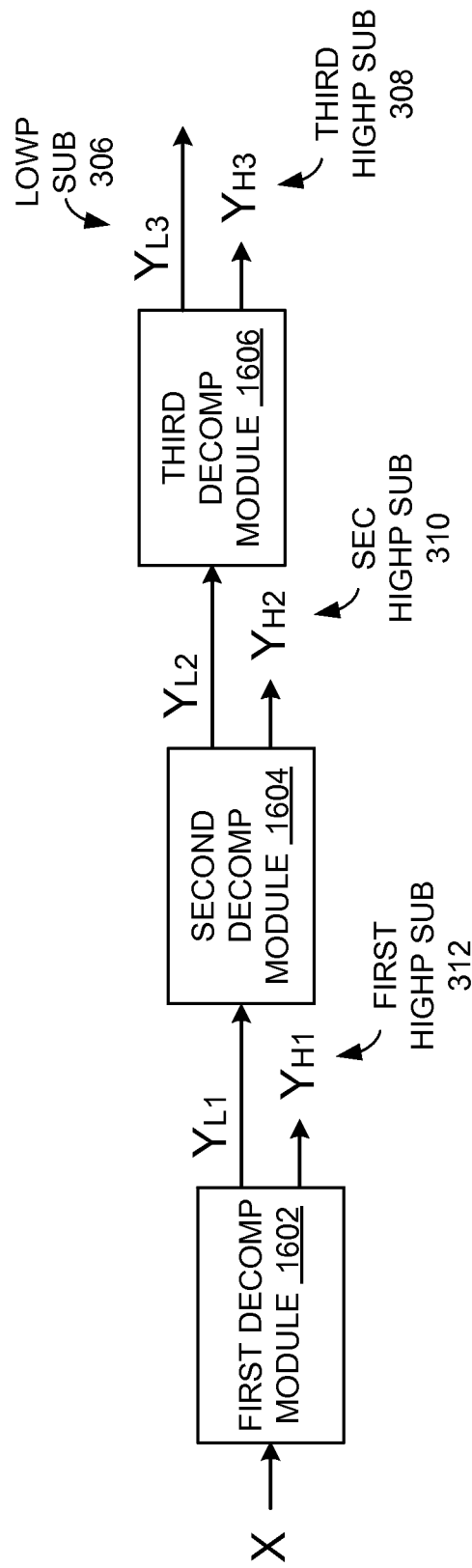
FIG. 16 is another example of the wavelet coefficients of the 3-level wavelets.

Here, X[i] are pixel values of the raw image blocks 226 in FIG. 3 with index i. X[−1]=X[3] and X[0]=X[2] can be obtained by symmetric extension of the raw image blocks 226. For the next level of the wavelet transform, this process can be iterated on the lowpass subband $Y_L$ of the previous level. FIG. 3 shows an example of wavelets with 3 levels. FIG. 16 subsequently shows another example of the 3-level wavelets.

The wavelet coefficients 216 can be allocated to different subbands. Three levels of wavelets can be used. For example, the wavelet coefficients 216 can be calculated for a lowpass subband 306, a third highpass subband 308, a second highpass subband 310, and a first highpass subband 312. Each of the subbands represents a time and frequency range for the wavelet coefficients 216. The wavelet coefficients 216 can be calculated for the lowpass subband 306, the third highpass subband 308, the second highpass subband 310, and the first highpass subband 312 as previously described in Equations 1-3.

Figure 4:
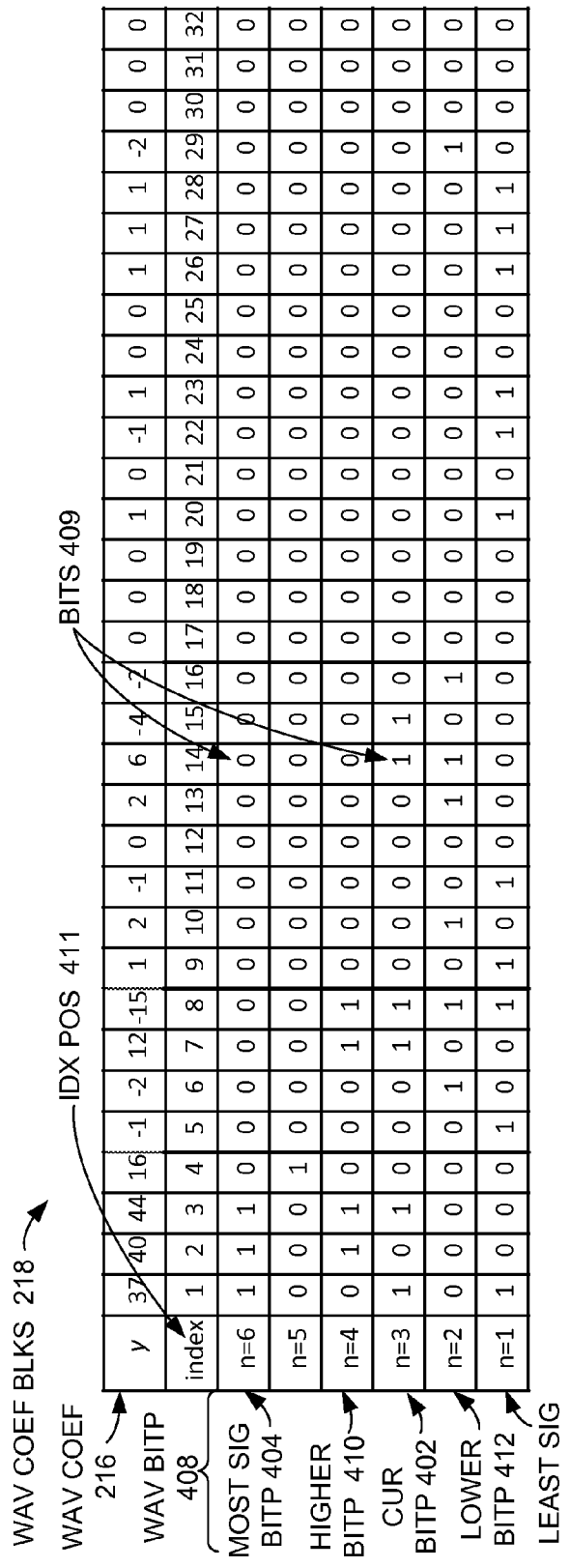
FIG. 4 is an example of one of the wavelet coefficient blocks.

Referring now to FIG. 4, therein is shown an example of one of the wavelet coefficient blocks 218. The wavelet coefficient blocks 218 are a binary representation of the wavelet coefficients 216. The wavelet coefficients 216 are a time and frequency transformation of the raw image blocks 226 of FIG. 2.

Each of the wavelet coefficient blocks 218 includes representations of bitplanes of the wavelet coefficients 216. Each of wavelet bitplanes 408 represents all bits 409 at a particular bit depth of binary values representing the wavelet coefficients 216.

The wavelet coefficient blocks 218 can include a current bitplane 402, a most significant bitplane 404, and a least significant bitplane 406. Each of the current bitplane 402, the most significant bitplane 404, and the least significant bitplane 406 represents the bits 409 at a particular bit depth of the wavelet coefficients 216 of the wavelet coefficient blocks 218.

The current bitplane 402 represents data of a bitplane being coded or decoded. The most significant bitplane 404 can represent the highest binary bit value of one of the wavelet coefficients 216. The least significant bitplane 406 can represent the lowest binary bit value of one of the wavelet coefficients 216.

Each of the wavelet bitplanes 408 can include an index position 411. For example, the index position 411 can range between 1 and 32. The index position 411 represents the location of one of the wavelet coefficients 216 in one of the wavelet coefficient blocks 218.

A higher bitplane 410 is a bitplane that has a greater bitplane value than the current bitplane 402. A lower bitplane 412 is a bitplane having a lower bitplane value than the current bitplane 402.

The wavelet coefficients 216 of the wavelet coefficient blocks 218 represent different subbands showing time and frequency values. For example, the first four elements of each of the wavelet bitplanes 408 represent the lowpass subband 306 of FIG. 3.

Figure 5:
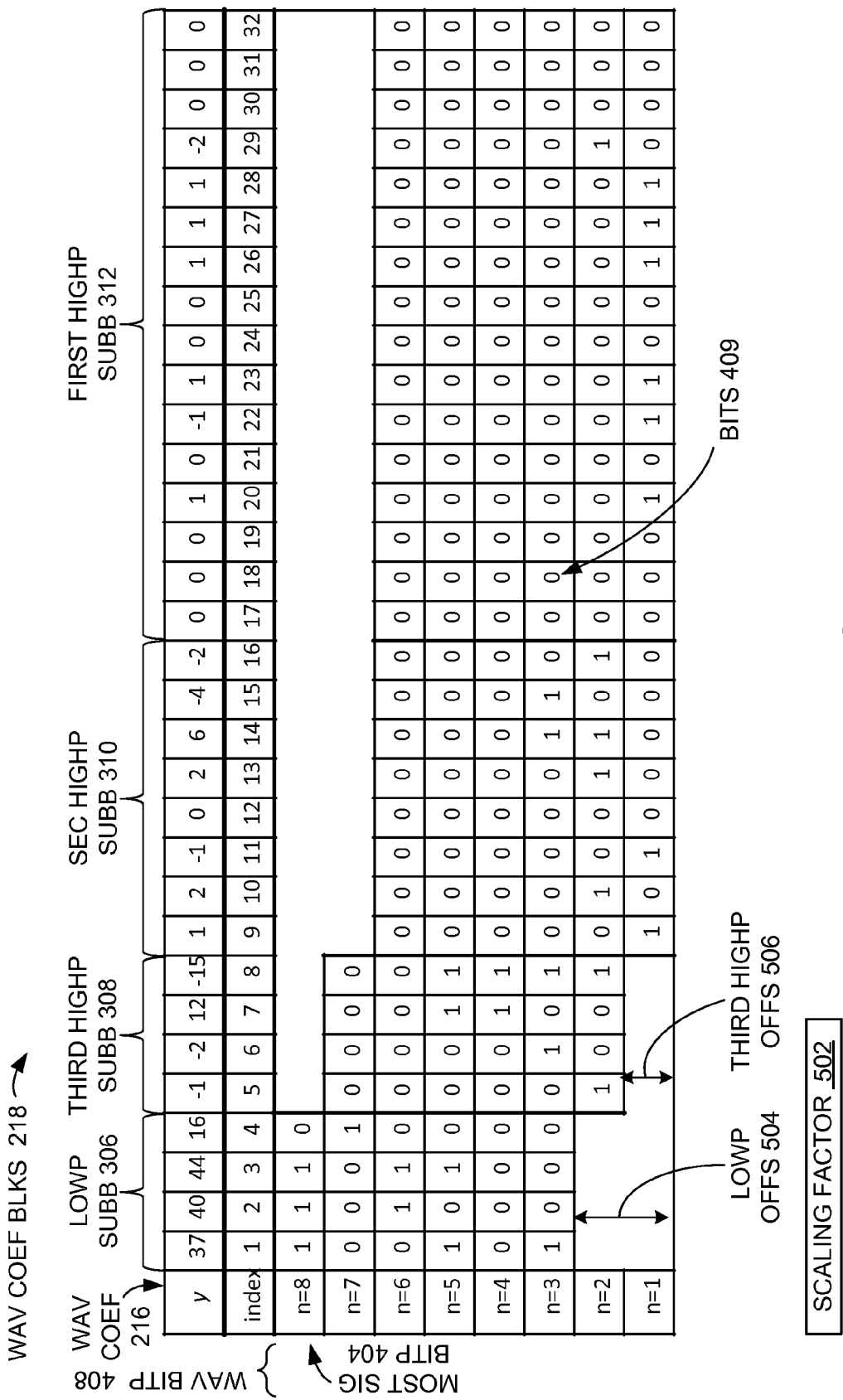
FIG. 5 is a second example the wavelet coefficient blocks.

Referring now to FIG. 5, therein is shown a second example the wavelet coefficient blocks 218. The wavelet coefficient blocks 218 can be modified by selectively shifting the subbands by a scaling factor 502 to prioritize certain subbands by altering the scan pattern.

Each of the wavelet coefficient blocks 218 can include a number of the wavelet coefficients 216. Each of the wavelet bitplanes 408 can include a number of the bits 409 at a particular bit depth of binary values representing the wavelet coefficients 216.

The lowpass subband 306 can be shifted by the scaling factor 502, such as a lowpass offset 504. After the lowpass subband 306 is shifted by the lowpass offset 504, the most significant bitplane 404 is at n=8. For example, the lowpass subband 306 can be multiplied by four to shift the bit pattern of the wavelet coefficients 216 up by a two-bit position. Shifting the values by the two-bit position increases the effective value of the lowpass subband 306 of the wavelet coefficients 216 and gives them more weight in the compressed values.

The third highpass subband 308 can be shifted by the scaling factor 502, such as a third highpass offset 506. For example, the third highpass subband 308 can be multiplied by 2 to shift the bit pattern of the wavelet coefficient up by a one-bit position.

The prioritization scheme can prioritize each of the subbands differently. In yet another example, the second highpass subband 310 and the first highpass subband 312 can remain unshifted.

To lower the dynamic range of the wavelet coefficients 216 of the lowpass subband, the raw image blocks 226 of FIG. 2, such as for the luma component 210 of FIG. 2, can be subtracted by the offset $2^{bitdepth-2}$. In another example, the chroma component offset can be $2^{bitdepth-1}$.

It has been discovered that upshifting the lowpass subband 306 can improve the compression performance by prioritizing the lower frequency information in the wavelet coefficient blocks 218. Prioritizing the lower frequency information can improve compressed image quality by compressing the most representative image data.

Figure 6:
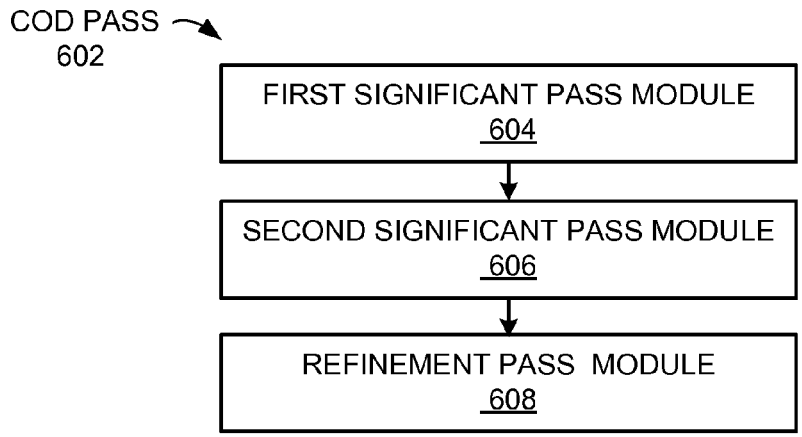
FIG. 6 is an example of coding passes.

Referring now to FIG. 6, therein is shown an example of coding passes 602. The coding passes 602 can perform three passes through the data to encode entirety of the source image 202 of FIG. 2. The coding passes 602 can include a first significant pass module 604, a second significant pass module 606, and a refinement pass module 608.

The first significant pass module 604 can pre-process the current bitplane 402 of FIG. 4 of each of the wavelet coefficient blocks 218 of FIG. 2. The first significant pass module 604 can detect the bits 409 of FIG. 4 that have a value of 1 and flag them as significant. The first significant pass module 604 is described in detail below.

The second significant pass module 606 can encode the data from the current bitplane 402 using partitioning as well as entropy coding techniques to compress the data. For example, the second significant pass module 606 can employ a Golomb code to encode the bits 409 of the wavelet coefficient blocks 218. The second significant pass module 606 is described in detail below.

The refinement pass module 608 can update intermediate values and store state information used to compress the data of the wavelet coefficient blocks 218. The refinement pass is described in detail below.

In embodiments of an innovation used in the image processing system 100 of FIG. 1, a wavelet-based bitplane coding technique is proposed for YUV images or images with other formats with the following specifications. The wavelet-based bitplane coding technique can provide a low-complexity approach, which is designed for 1-D image blocks.

At a not very high rate, the wavelet-based bitplane coding technique can provide visually lossless compression of images at a predetermined compression rate. The predetermined compression rate can be 3 bits per sample (bps) or less. The wavelet-based bitplane coding technique can provide a random access. In other words, the blocks can be coded independently.

The wavelet-based bitplane coding technique can include three coding passes using the first significant pass module 604, the second significant pass module 606, and the refinement pass module 608. The three coding passes can be used for a binary decomposition codec (BDC) technique.

The first significant pass module 604 can include a step or an algorithm similar to a wavelet codec including a set partitioning embedded block (SPECK) coding. The second significant pass module 606 can include an algorithm different from a low-complexity embedded wavelet codec based on a binary adaptive Golomb coding of partitions. As a specific example, the binary adaptive Golomb (BAG) coding is described in the concurrently filed U.S. patent application entitled "IMAGE PROCESSING SYSTEM WITH WAVELET BASED GOLOMB CODING AND METHOD OF OPERATION THEREOF".

The embodiments of the innovation can lie in or can be described in the second significant pass module 606. The second significant pass module 606 can be a vehicle of a codec. The second significant pass module 606 can include a step or a method that applies a 1-D algorithm of a two-dimensional (2-D) algorithm. For example, the 2-D algorithm can be given in or provided by an efficient, low-complexity image coding with a set-partitioning embedded block coder.

The second significant pass module 606 includes an algorithm different from the 2-D algorithm of the efficient, low-complexity image coding with the set-partitioning embedded block coder as described below. A difference is that the algorithm used in the second significant pass module 606 is 1-D.

Another difference is that a decomposition used in the second significant pass module 606 is done up to regions having a minimum size of 4 bits. The minimum size is not less than 4 bits. A further difference is that the second significant pass module 606 uses vectors instead of lists. The refinement pass module 608 can include can include a step or an algorithm used in many codecs.

The first significant pass module 604, the second significant pass module 606, and the refinement pass module 608 can be implemented in the encoding module 232 of FIG. 2 to code the bitstream 220 of FIG. 2. Operations inverse to operations of the first significant pass module 604, the second significant pass module 606, and the refinement pass module 608 can be implemented in the decoding module 234 of FIG. 2 to decode the bitstream 220.

The first significant pass module 604 can be coupled to the second significant pass module 606. The second significant pass module 606 can be coupled to the refinement pass module 608.

Figure 7:
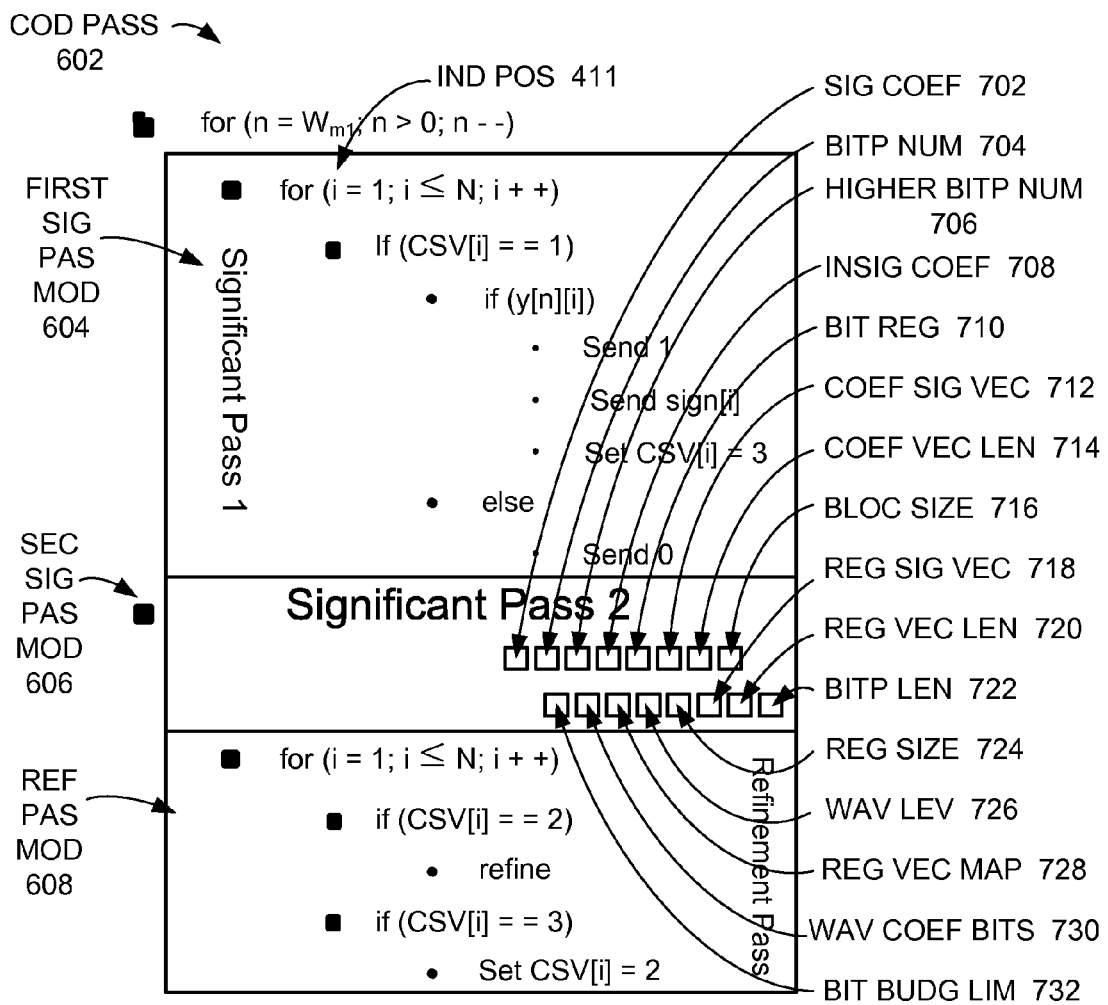
FIG. 7 is an example of an algorithm implemented in the coding passes.

Referring now to FIG. 7, therein is shown an example of an algorithm implemented in the coding passes 602. The algorithm includes methods used in the first significant pass module 604, the second significant pass module 606, and the refinement pass module 608.

A significant coefficient 702 is one of the wavelet coefficients 216 of FIG. 2. One of the wavelet coefficients 216 is called significant and thus is the significant coefficient 702 at a bitplane number 704, denoted as n, if the one of the wavelet coefficients 216 includes a non-zero value, which is a value of only 1, at a higher bitplane number 706, denoted as $n_1$, where $n_1$ is a value >n.

An insignificant coefficient 708 is one of the wavelet coefficients 216. One of the wavelet coefficients 216 is called insignificant and thus the insignificant coefficient 708 at the bitplane number 704, denoted as n, if the one of the wavelet coefficients 216 has a value of 0 at the higher bitplane number 706, denoted as $n_1$, for all values of $n_1$>n.

Bit regions 710 are sets that cover a number of the bits 409 of FIG. 4. One of the bit regions 710, denoted as T=[k, M], indicates a region starting at an index k and has a length M in a number of the bits 409. The bit regions 710 are significant if they include a nonzero (or 1) value, and they are insignificant otherwise.

Unlike the algorithm in the set partitioning embedded block (SPECK) coding that uses 3 lists of a list of insignificant points (LIP), a list of insignificant multi-point sets (LIS), and a list of significant pixels (LSP), the embodiments propose 2 vectors instead that are more hardware friendly.

One of the proposed vectors is a coefficient significance vector 712, denoted as CSV. The coefficient significance vector 712 is information about significance of the wavelet coefficients 216. The coefficient significance vector 712 can include a coefficient vector length 714.

The coefficient vector length 714 is a numerical value in a number of bits. The coefficient vector length 714 can be the same as an input block size or a block size 716, denoted as N, of each of the wavelet coefficient blocks 218 of FIG. 2. The coefficient significance vector 712 can include a numerical value that is the same as a numerical value of the block size 716.

The coefficient significance vector 712 can include four values below.
- 0: initial value
- 1: insignificant coefficient
- 2: significant coefficient
- 3: a coefficient that just became significant in the current bitplane 402 of FIG. 4

Another of the proposed vectors is a region significance vector 718, denoted as RSV. The region significance vector 718 is information about significance of the bit regions 710. The region significance vector 718 can be a vector with a region vector length 720.

The region vector length 720 is a numerical value in a number of bits. The region vector length 720 can be the same as a bitplane length 722, denoted as $N_n$, of one of the wavelet bitplanes 408 of FIG. 4. The region vector length 720 can be the same as the block size 716 at maximum. The region vector length 720 can include a numerical value that is the same as a numerical value of the bitplane length 722 or the block size 716.

A region size 724 of the bit regions 710 can include a minimum value of 4 bits. Hence, the effective length of the region significance vector 718, denoted as RSV, is $N_n/4$, where $N_n$ is the bitplane length 722. The region significance vector 718 can include 8 values if 3 wavelet levels 726 are used and the region vector length 720, denoted as $N_n$, equals to 64. The region significance vector 718 can include a numerical value in a range of 0 to 7, where the numerical value maps to the region size 724 based on a region vector map 728, denoted as RSVmap.

The region significance vector 718 can be expressed as a member of a set ($\in$) of $\{0, 1, 2, 3, 4, 5, 6, 7\}$. The region vector map 728 can include a numerical value of as a member of a set of $\{0, 4, 8, 16, 24, 32, 48, 56\}$.

For example, the region significance vector 718 having a value of 0, 1, 2, 3, 4, 5, 6, or 7 can be associated with the region vector map 728 having a value of 0, 4, 8, 16, 24, 32, 48, or 56, respectively. As a specific example, the region significance vector 718 of RSV[9]=7 shows one of the bit regions 710 as an insignificant region of size RSVmap[7]=56 starting at index 9 (to 64). For different parameters other than those shown here as examples, the region significance vector 718 values can be changed appropriately.

For example, a proposed wavelet-based codec, named BDC, of the embodiments can include 3 coding passes or the coding passes 602 as mentioned earlier. Also for example, a pseudo-code of the first significant pass module 604 and the refinement pass module 608 of an encoder or the encoding module 232 of FIG. 2 are shown in FIG. 7.

In the example of the pseudo-code, "n" denotes the bitplane number 704, "1" denotes a coefficient index or the index position 411. Also in the example, y[n][i] denotes one of wavelet coefficient bits 730 of one of the wavelet coefficients 216 at the bitplane number 704 "n" and the index position 411 "i".

In a bitplane coding of the wavelet bitplanes 408, the bitplane coding can start at a most-significant bit (MSB) bitplane or the most significant bitplane 404 of FIG. 4 (here n=$W_m$=6) for the luma component 210 of FIG. 2. Note that when the wavelet coefficients 216 are scaled as in FIG. 5, the most significant bitplane 404 can be updated to $W_{m1}$. For example, $W_{m1}$=8 in FIG. 5. So after scaling, the bitplane coding can start at n=$W_{m1}$. A step of running or performing all of the 3 coding passes for the most significant bitplane 404, and then go to the next bitplane, which is another of the wavelet bitplanes 408 with the bitplane number 704 $n-1$, and repeat the step of running all of the 3 coding passes. The process above continues until all of the wavelet coefficient bits 730 are coded or a bit budget limit 732, denoted as bitbudget, in the bitstream 220 of FIG. 2 is reached.

The embodiments of the innovation can include the second significant pass module 606 of the BDC. In the second significant pass module 606, the bit regions 710 in the wavelet bitplanes 408 can be looked at or examined to see if the bit regions 710 are insignificant or not. Before starting coding of the wavelet bitplanes 408, the coefficient significance vector 712, denoted as CSV, and the region significance vector 718, denoted as RSV, can be initialized to 0.

In the pseudo code, a "for loop" of the bitplane number 704, denoted as n, for the luma component 210, the bitplane number 704 can start from $W_{m1}$ and decrement down to 1. $W_{m1}$ denotes the bitplane number 704 of the most significant bitplane 404 after scaling the wavelet coefficients 216.

In the first significant pass module 604, a block range or the index position 411, denoted as i, can be considered to be from 1 to N, where N is a total number of bits in one of the wavelet bitplanes 408. N can be the same as a block size. For example, the block size can be 32 as shown in FIG. 4. Also for example, a pseudo code of the second significant pass module 606 will be given or provided in FIGS. 11-13.

Figure 8:
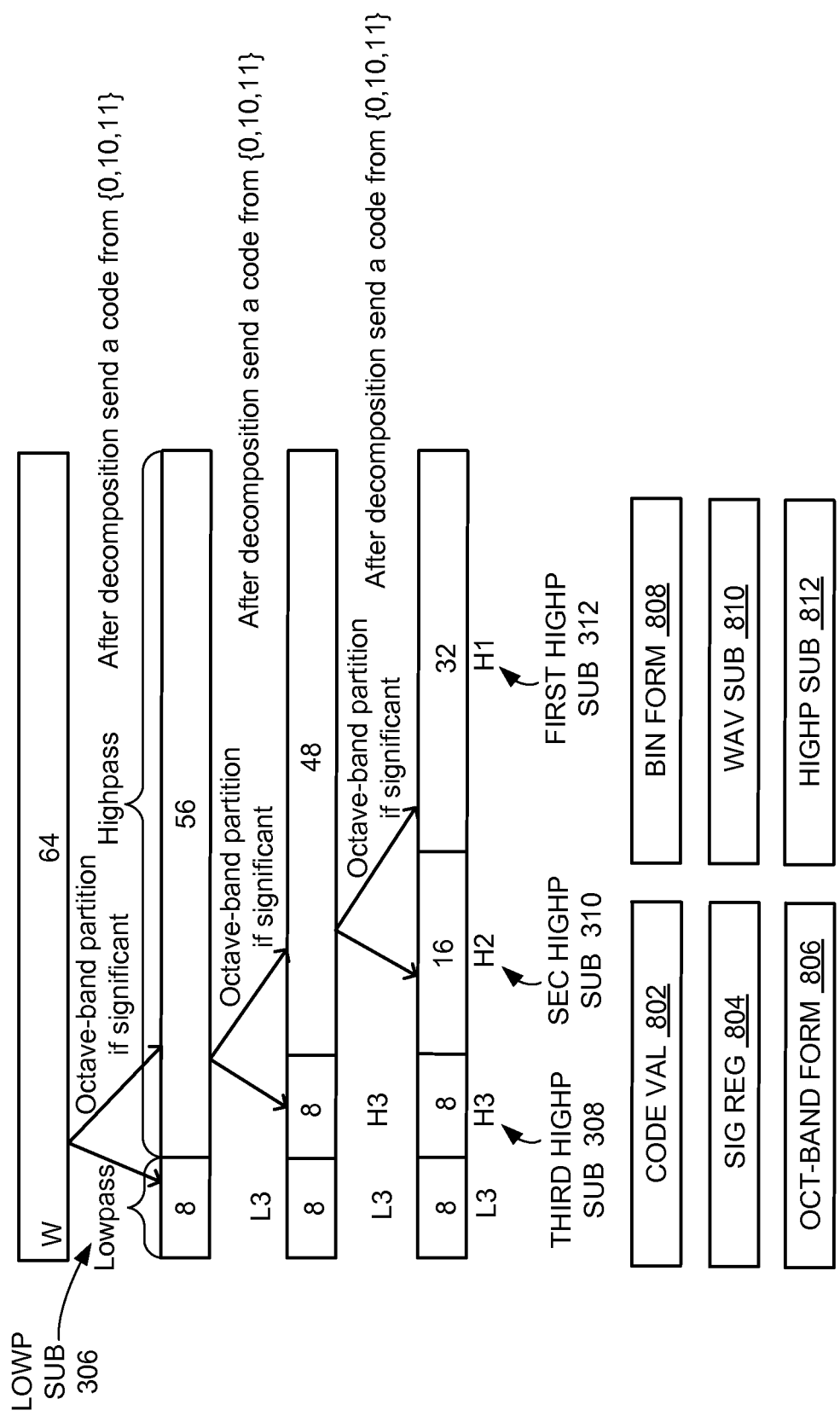
FIG. 8 is an example of the second significant pass module using an octave-band decomposition of the bit regions.

Referring now to FIG. 8, therein is shown an example of the second significant pass module 606 of FIG. 6 using an octave-band decomposition of the bit regions 710 of FIG. 7. In the second significant pass module 606, significance of the bit regions 710 in the region significance vector 718 of FIG. 7, denoted as RSV, can be saved. If one of the bit regions 710 is insignificant, the one of the bit regions 710 can be kept or stored in the region significance vector 718 and send 0.

In the second significant pass module 606, if one of the bit regions 710 is significant and it has a size or the region size 724 of FIG. 7 greater (>) than 4, the one of the bit regions 710 can be decomposed using a decomposition rule below. A code value 802 using a binary value from a set of {0, 10, 11} can be generated and sent using a procedure called CodeTogether, which will be subsequently described below. If one of the bit regions 710 includes the region size 724 of 4 and is significant, the bits 409 of FIG. 4 of the one of the bit regions 710 can be coded using Golomb code given in FIG. 10.

The decomposition rule or a partitioning rule for the second significant pass module 606 is as follows. The decomposition rule includes a binary decomposition used to divide or partitioning a significant region 804, denoted as T, with the region size 724 greater than 4 bits into two of the bit regions 710, denoted as T1 and T2. The significant region 804 is one of the bit regions 710 that are significant.

The significant region 804 can be partitioned based on 2 forms. The forms can include an octave-band form 806 and a binary form 808. The octave-band form 806 is a case for one of the bit regions 710 that cover more than a wavelet subband 810, which represents a time and frequency range for the wavelet coefficients 216 of FIG. 2. The wavelet subband 810 can represent one of the lowpass subband 306, the third highpass subband 308, the second highpass subband 310, and the first highpass subband 312 when 3 wavelet decomposition levels are used. The wavelet decomposition levels can be set to 3 or 4 for the proposed approach.

Figure 9:
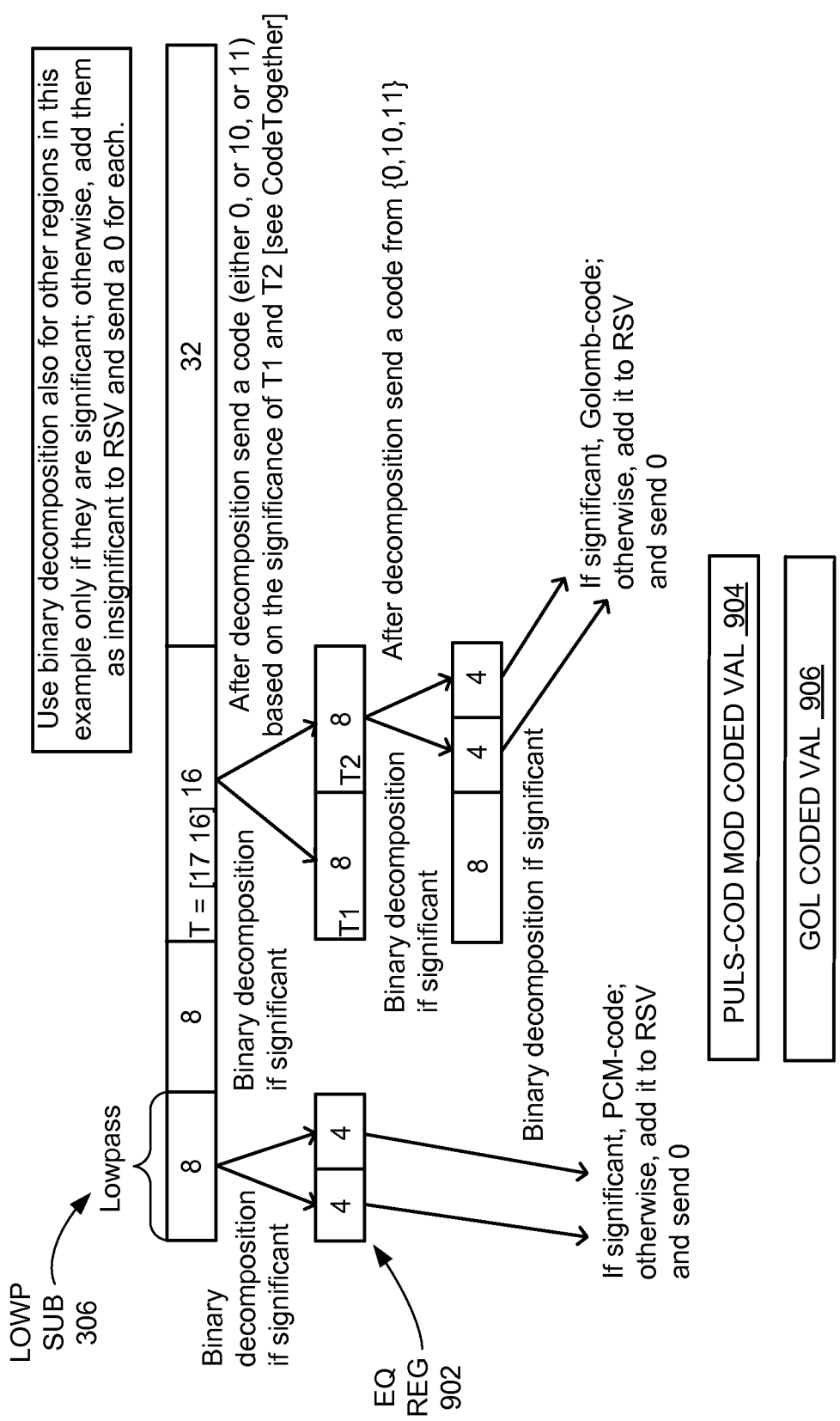
FIG. 9 is an example of the second significant pass module of FIG. 6 using a binary decomposition of the bit regions of FIG. 7 into equal partitions.

FIG. 8 shows an example of how the significant region 804 can be decomposed using the octave-band form 806. FIG. 9 shows an example of how the significant region 804 can be decomposed using the binary form 808 (into equal regions).

In the example of the octave-band form 806, the significant region 804 can be partitioned into the lowpass subband 306 and the highpass subbands 812, which represents a time and frequency range for the wavelet coefficients 216. After the octave-band decomposition of the significant region 804 completes, the code value 802 using a binary value from a set of {0, 10, 11} can be generated and sent.

The highpass subbands 812 can be further partitioned into the third highpass subband 308 and the rest of the highpass subbands 812, which can include highpass subbands 2 and 1, using the octave-band form 806, and the code value 802 from a binary value from a set of {0, 10, 11} can be generated and sent. The rest of the highpass subbands 812 can subsequently be partitioned into the second highpass subband 310 and the first highpass subband 312 using the octave-band form 806, and the code value 802 using a binary value from a set of {0, 10, 11} can be generated and sent.

Referring now to FIG. 9, therein is shown an example of the second significant pass module 606 of FIG. 6 using a binary decomposition of the bit regions 710 of FIG. 7 into equal partitions. The binary form 808 of FIG. 8 uses the binary decomposition to partition the significant region 804 of FIG. 8 into two equal regions 902, which are groups of the bits 409 of FIG. 4 with equal sizes. In the binary form 808, the significant region 804 can be simply halved into two of the equal regions 902.

The example shows that the lowpass subband 306 can be partitioned using the binary form 808 into two of the equal regions 902 if one of the bit regions 710 representing the lowpass subband 306 is significant. In this case, one of the bit regions 710 representing the lowpass subband 306 is the significant region 804. The lowpass subband 306 includes 8 bits, and each of the equal regions 902 includes 4 bits.

If one of the equal regions 902 is significant, a pulse-code modulation coded value 904, denoted as PCM code, can be generated for the one of the equal regions 902. Otherwise, the equal regions 902 can be added to the region significance vector 718 of FIG. 7, denoted as RSV, and send a binary value of 0.

The significant region 804, denoted as T, with the region size 724 of FIG. 7 greater than 4 can be partitioned into two of the bit regions 710, denoted as T1 and T2. After the decomposition, the code value 802 of FIG. 8 can be generated and sent. The code value 802 can include a binary value of either 0, 10, or 11. The code value 802 can be generated based on the significance of T1 and T2 using the CodeTogether procedure.

If T1 is significant, it can further be partitioned by the binary decomposition using the binary form 808 into two of the equal regions 902. If T2 is significant, it can further be partitioned by the binary decomposition using the binary form 808 into two of the equal regions 902 or by the octave-band decomposition if T2 covers more than one wavelet subband. After the decomposition, the code value 802 can be generated and sent. The code value 802 can include a binary value of either 0, 10, or 11.

If one of the equal regions 902 is significant, a Golomb coded value 906 can be generated for the one of the equal regions 902. Otherwise, the equal regions 902 can be added to the region significance vector 718, denoted as RSV, and send a binary value of 0. For example, each of the equal regions 902 can have a size of 4 bits.

The binary decomposition can also be used for any of the bit regions 710 in this example only if they are significant. Otherwise, the bit regions 710 can be added as insignificant to the region significance vector 718, denoted as RSV, and send a binary value of 0 for each of the bit regions 710.

In a routine or the procedure of the CodeTogether, when one of the bit regions 710, denoted as T, is significant, it can be decomposed or partitioned into two of the bit regions 710, denoted as T1 and T2. Based on at least T1 or T2 is significant, there may be 3 cases:

| S1: | T1 significant, | T2 insignificant |
| S2: | T1 insignificant, | T2 significant |
| S3: | T1 significant, | T2 significant |

The significance of T1 and T2 can be coded together, thus the name CodeTogether. The code value 802 using a binary value from a set of {0, 10, 11} can be generated and used. Hence, the case that is a most likely event, a binary code value of 0 can be used. For the other 2 cases, binary code values of 10 and 11 can be used.

For the luma component 210 of FIG. 2, denoted as W, the following binary values can be used.

| 0 | for | S1 |
| 10 | for | S2 |
| 11 | for | S3 |

For the chroma component 212 of FIG. 2, denoted as J, the following binary values can be used.

| 0 | for | S2 |
| 10 | for | S3 |
| 11 | for | S1 |

Figure 10:
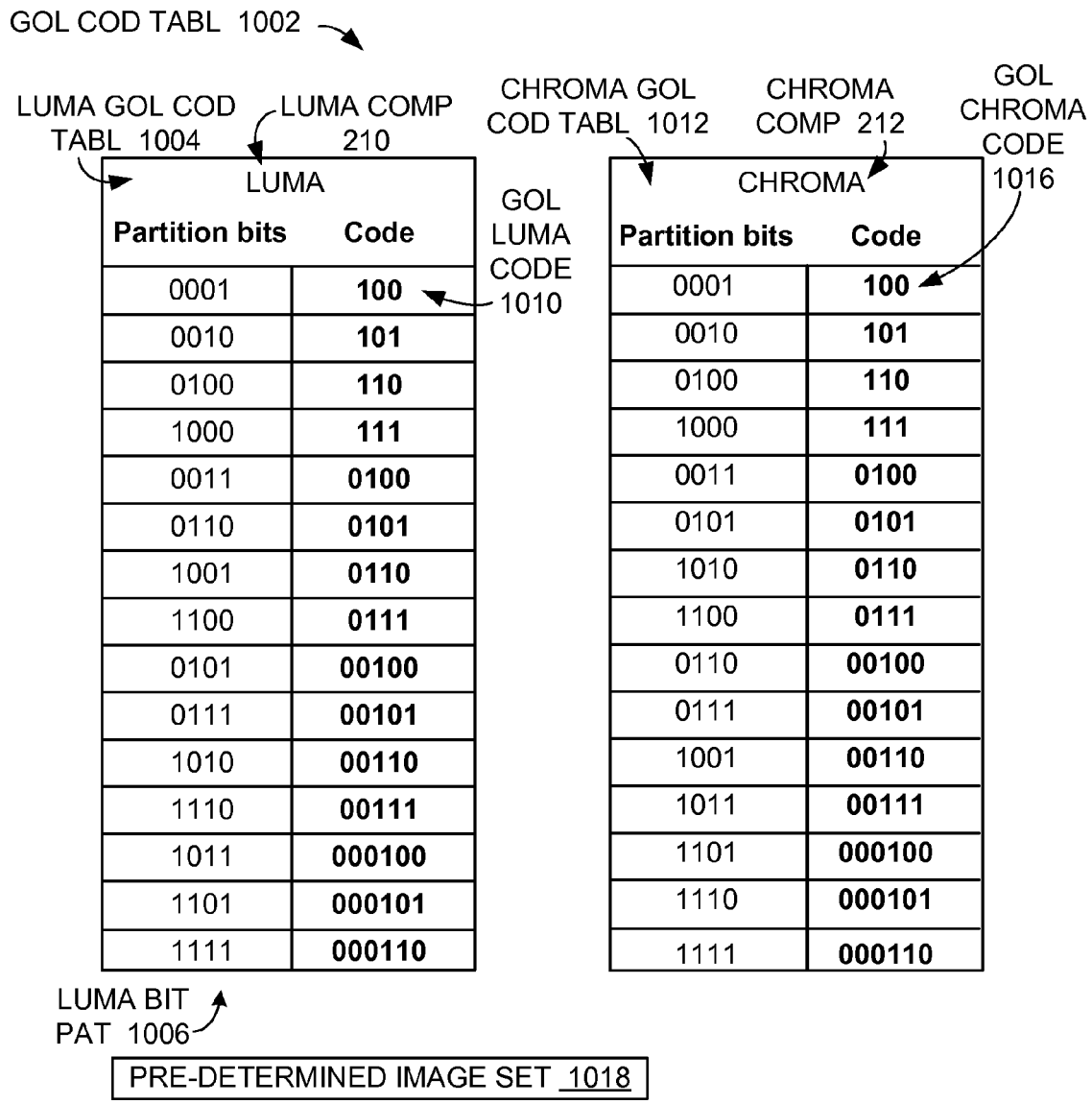
FIG. 10 is an example of a Golomb code table.

Referring now to FIG. 10, therein is shown an example of a Golomb code table 1002. The Golomb code table 1002 can map a bit sequence to the Golomb coded value 906 of FIG. 9. The Golomb coded value 906 can be used to code the significant region 804 of FIG. 8 having a length or the region size 724 of FIG. 7 of 4 in the BDC codec for the luma component 210 and the chroma component 212.

For example, the Golomb code table 1002, such as a luma Golomb coding table 1004, can provide a mapping between a luma bit pattern 1006 and the Golomb coded value 906, such as a Golomb luma code 1010 for luma values. In another example, the Golomb code table 1002, such as a chroma Golomb coding table 1012, can provide a mapping between a bit sequence and the Golomb coded value 906, such as a Golomb chroma code 1016 for chroma values. The Golomb coded value 906 is a substitution bit sequence for replacing frequently used bit sequences with shorter bit patterns for compression.

Although the current examples are for the Golomb code table 1002 for a YUV color model, it is understood that the Golomb code table 1002 can be used to encode other color models. For example, the Golomb code table 1002 could be used to encode other color models such as Red-Green-Blue (RGB), Cyan-Magenta-Yellow-Key (CMYK), raw Bayer, or other similar color models.

The Golomb code table 1002 can be calculated in different ways. For example, the Golomb code table 1002 can be calculated based on statistical values, use frequency, based over a pre-determined image set 1018, or a combination thereof.

The pre-determined image set 1018 is generated based on a predefined or selected set of images. The pre-determined image set 1018 can include images that are selected to represent or images that have similar characteristics of actual images that are to be processed by the image processing system 100 of FIG. 1.

Figure 11:
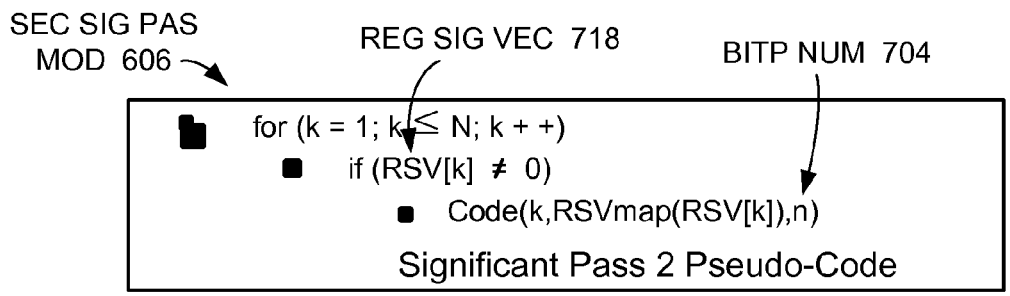
FIG. 11 is a first portion of a pseudo-code of the second significant pass module.

Referring now to FIG. 11, therein is shown a first portion of a pseudo-code of the second significant pass module 606. The pseudo-code can include an initialization of the region significance vector 718, denoted as RSV. For example, it is assumed that 3 of the wavelet levels 726 of FIG. 7 and the block size 716 of FIG. 7 of 64 can be used.

If $W_m > 2$, the region significance vector 718, denoted as RSV, can be initialized to 0 and the region significance vector 718 can be set. $W_m$ is a number of the most significant bitplane 404 of FIG. 4 before scaling. For example, FIG. 4 shows $W_m = 6$. $W_{m1}$ is the number of the most significant bitplane 404 after scaling. For example, FIG. 5 shows $W_{m1} = 8$.

The region significance vector 718 starting at the index position 411 of FIG. 4 of 1, denoted as RSV[1], can be set to 2 when the bitplane number 704, denoted as n, equals to $W_m + 2$ or $W_{m1}$ using Equation 4 below. That is, the third highpass subband 308 of FIG. 3, denoted as L3, is the only insignificant region.

$$RSV[1]=2 \text{ at } n=W_m+2=W_{m1} \qquad (4)$$

At $n=W_m+1$, set RSV[9]=2 and do not change the rest of the region significance vector 718, denoted as RSV. This indicates that H3 can be added as insignificant.

At $n=W_m$, the region significance vector 718, denoted as RSV, can be checked if the region significance vector 718 still includes RSV[9]=2. If not, the region significance vector 718 can be set so that RSV[17]=6. Then, [H2, H1] can be added as a whole insignificant region. If yes, the region significance vector 718 can be set so that RSV[9]=7. Then, [H3, H2, H1] can be added as a whole insignificant region.

Bitplane coding can be stopped for L3 at n=2 and H3 at n=1 by setting the region significance vector 718, denoted as RSV, based on the coefficient significance vector 712 of FIG. 7, denoted as CSV, using Equations 5-6.

$$RSV[1:8]=CSV[1:8]=0 \text{ before starting bitplane } n=2 \qquad (5)$$

$$RSV[1:16]=CSV[1:16]=0 \text{ before starting bitplane } n=1 \qquad (6)$$

As a special case, if $0 < W_m < 3$, the region significance vector 718, denoted as RSV, can be initialized using Equation 7 as follows.

$$RSV[9]=7 \text{ (the rest of RSV is zero)} \qquad (7)$$

In the special case, [H3, H2, H1] can be set as a whole insignificant region. For the chroma component 212 of FIG. 2, initialization can be slightly different due to a different coefficient scan.

The pseudo-code includes a for loop with an index variable k that increments by 1 from 1 to N, which is a maximum number of the index position 411. If the region significance vector 718, denoted as RSV, at the index variable k is not 0, then a coding routine begins using an algorithm described in FIG. 12.

Figure 12:
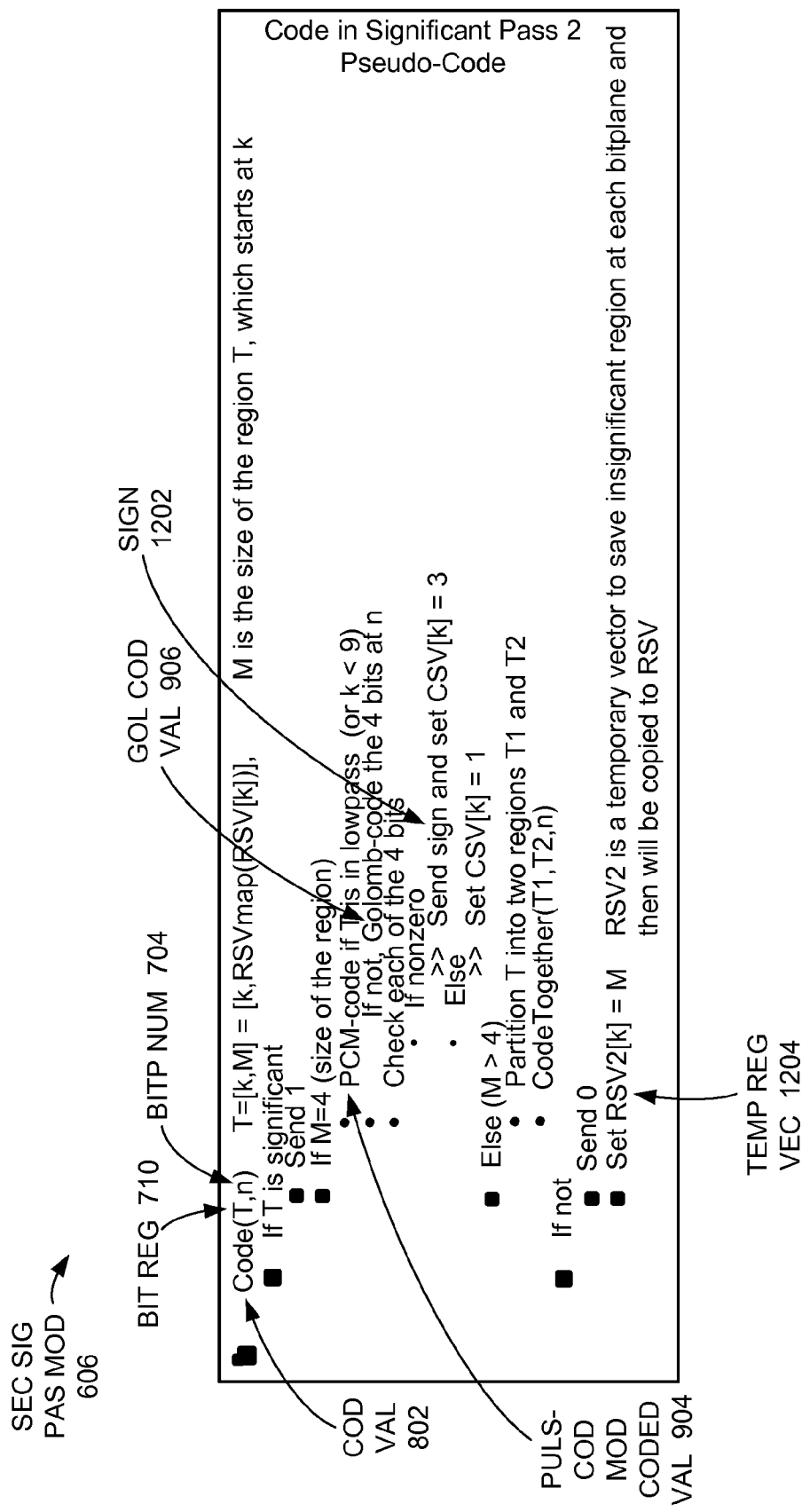
FIG. 12 is a second portion of the pseudo-code of the second significant pass module.

Referring now to FIG. 12, therein is shown a second portion of the pseudo-code of the second significant pass module 606. The pseudo-code includes the coding routine previously mentioned in FIG. 11.

The coding routine can be used to generate the code value 802 to be sent in the bitstream 220 of FIG. 2. The code value 802, denoted as Code(T, n), can be generated for one of the bit regions 710, denoted as T, at the bitplane number 704, denoted as n. The one of the bit regions 710 can be specified using Equation 8 as follows.

$$T=[k,M]=[k,\text{RSVmap}(\text{RSV}[k])] \quad (8)$$

where M is a bit size or the region size 724 of FIG. 7 of the one of the bit regions 710, which starts at the index variable k.

If the one of the bit regions 710, denoted as T, is significant and thus is the significant region 804 of FIG. 8, a binary value of 1 is sent as the code value 802. If the region size 724, denoted as M, equals to 4, the pulse-code modulation coded value 904 can be generated and sent as the code value 802 if the one of the bit regions 710 is in the lowpass subband 306 of FIG. 3 or for the index variable k less than 9. If not, the Golomb coded value 906 can be generated and sent as the code value 802 for 4 of the bits 409 of FIG. 5 at the bitplane number 704 n. The Golomb coded value 906 can be generated using the Golomb code table 1002 of FIG. 10.

Each of the four of the bits 409 can be checked. If each of the four of the bits 409 is nonzero, a sign 1202 can be generated and sent out on the bitstream 220. Then, the coefficient significance vector can be set as CSV[k]=3. Otherwise, the coefficient significance vector can be set as CSV[k]=1.

If the region size 724, denoted as M, is not equal to 4 or is greater than 4, partition T into two of the bit regions 710 T1 and T2. The code value 802 can be generated for the bit regions 710 T1 and T2 based on the significance of T1 and T2 using the CodeTogether(T1, T2, n) procedure as subsequently described in FIG. 13.

If one of the bit regions 710 is not significant and thus is not the significant region 804, a binary value of 0 is sent as the code value 802. Then, a temporary region vector 1204, denoted as RSV2, can be set as RSV2[k]=M. The temporary region vector 1204 is a temporary vector used to save insignificant regions at each of the wavelet bitplanes 408 of FIG. 5 and then to be copied to RSV. The insignificant regions are the bit regions 710 that are insignificant.

Figure 13:
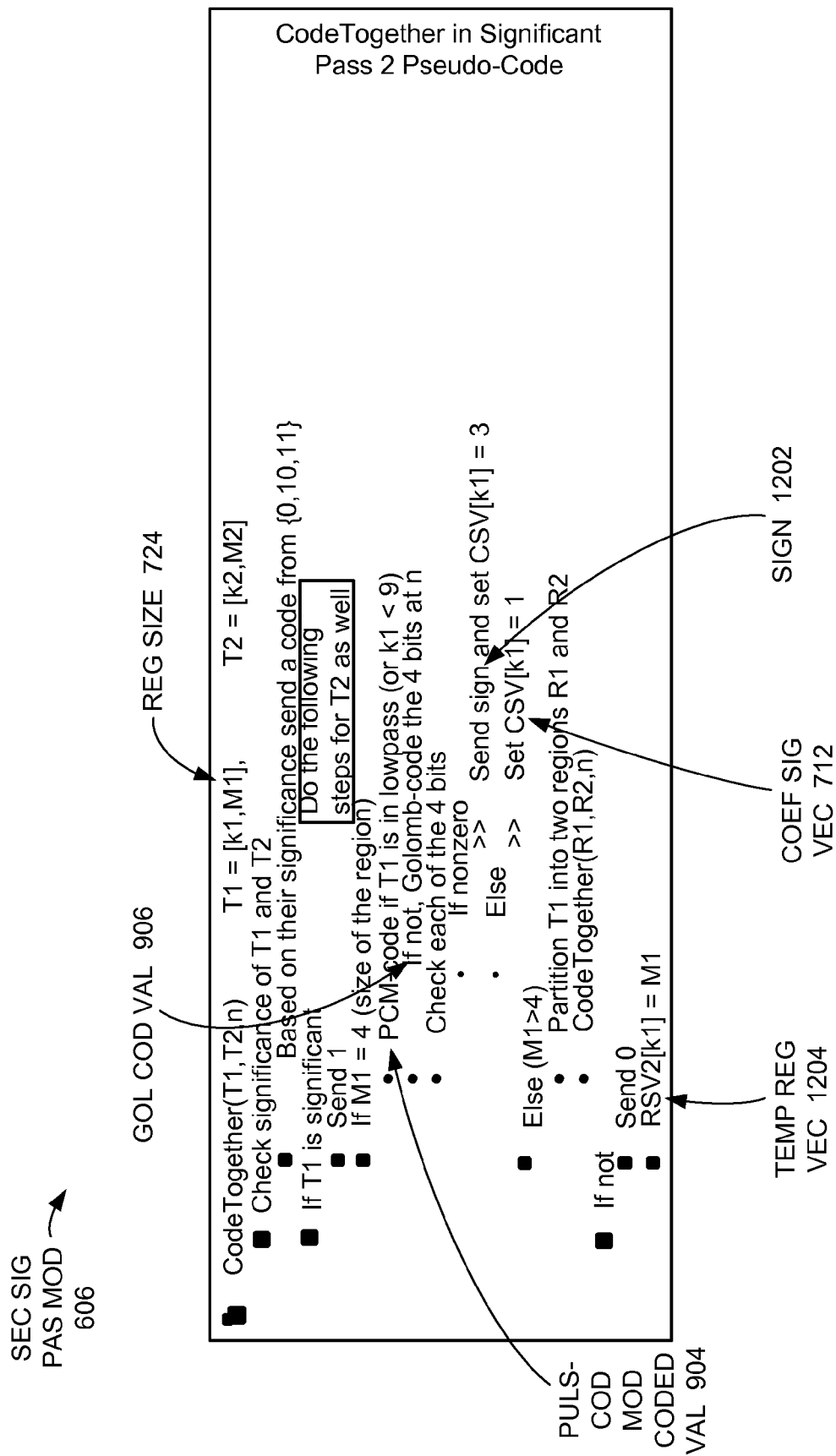
FIG. 13 is a third portion of the pseudo-code of the second significant pass module.

Referring now to FIG. 13, therein is shown a third portion of the pseudo-code of the second significant pass module 606. The pseudo-code includes the CodeTogether routine or procedure. The CodeTogether routine, denoted as CodeTogether (T1, T2, n), can be applied to T1 and T2, which are previously described as two of the bit regions 710 of FIG. 7 generated by partitioning the significant region 804 of FIG. 8, at the bitplane number 704 of FIG. 7, denoted as n. T1 and T2 can be expressed as T1=[k1, M1] and T2=[k2, M2], respectively.

The CodeTogether routine checks significance of T1 and T2, which are previously described as two of the bit regions 710 generated by partitioning the significant region 804. Based on the significance of T1 and T2, generate the code value 802 of FIG. 8 using a binary value from a set of {0, 10, 11}.

If T1 is significant and thus is the significant region 804, a binary value of 1 is sent as the code value 802. If the region size 724, denoted as M1, of T1 equals to 4, the pulse-code modulation coded value 904 can be generated and sent as the code value 802 if T1 is in the lowpass subband 306 of FIG. 3 or for the index variable k1 less than 9. If not, the Golomb coded value 906 can be generated and sent as the code value 802 for 4 of the bits 409 of FIG. 5 at the bitplane number 704, denoted as n. The Golomb coded value 906 can be generated using the Golomb code table 1002 of FIG. 10.

Each of the four of the bits 409 can be checked. If each of the four of the bits 409 is nonzero, the sign 1202 can be generated and sent out on the bitstream 220 of FIG. 2. Then, the coefficient significance vector can be set as CSV[k1]=3. Otherwise, the coefficient significance vector can be set as CSV[k1]=1.

If the region size 724, denoted as M1, is not equal to 4 or is greater than 4, partition T1 into two of the bit regions 710 R1 and R2. The code value 802 can be generated for the bit regions 710 R1 and R2 based on the significance of R1 and R2 using the CodeTogether routine, denoted as CodeTogether (R1, R2, n).

If T1 is not significant and thus is not the significant region 804, a binary value of 0 is sent as the code value 802. Then, the temporary region vector 1204, denoted as RSV2, can be set as RSV2[k1]=M1. Steps described above for T1 can be applied to T2 as well.

For YUV images, a scan mode and a joint coding method can be used. For example, the scan mode and the joint coding method can be given or provided by an efficient 1-D wavelet bitplane coding scan for joint coding of YUV images.

A detailed example of a proposed BDC encoder is described in FIGS. 14-15 below. In this example, three of the wavelet levels 726 of FIG. 7, for the block size 716 of FIG. 7 N=32, can be used. The three of the wavelet levels 726 can include the wavelet coefficients 216 of FIG. 2 of one level having the lowpass subband 306 and the third highpass subband 308 of FIG. 3, another level having the second highpass subband 310 of FIG. 3, and a further level having the first highpass subband 312 of FIG. 3. The region vector map 728 of FIG. 7 can include RSVmap={4, 8, 12, 16, 24, 28} for that example.

In the BDC codec or the proposed wavelet-based codec, the second significant pass module 606 can only be used for the wavelet bitplanes 408 of FIG. 5 with the bitplane number 704, denoted as n, using Equations 9-10 as follows.

$$n>2 \text{ in the luma component 210 of FIG. 2} \quad (9)$$

$$n>1 \text{ in the chroma component 212 of FIG. 2} \quad (10)$$

For a first of the wavelet bitplanes 408 of the chroma component 212 (n=1) and first two of the wavelet bitplanes 408 of the luma component 210 (n≤2), the second significant pass module 606 can be removed or bypassed by setting all the region significance vector 718 of FIG. 7, denoted as RSV, values to a binary value of 0. Then, the wavelet coefficients 216 associated with the region significance vector 718 previously set to 0 can be added to the first significant pass module 604 of FIG. 6 for processing by setting the coefficient significance vector 712, denoted as CSV, to a binary value of 1.

A BDC coding approach using the BDC codec can also be applied as a bitplane codec for discrete cosine transform (DCT) coefficients of image blocks. The image blocks can include the raw image blocks 226 of FIG. 2.

Figure 14:
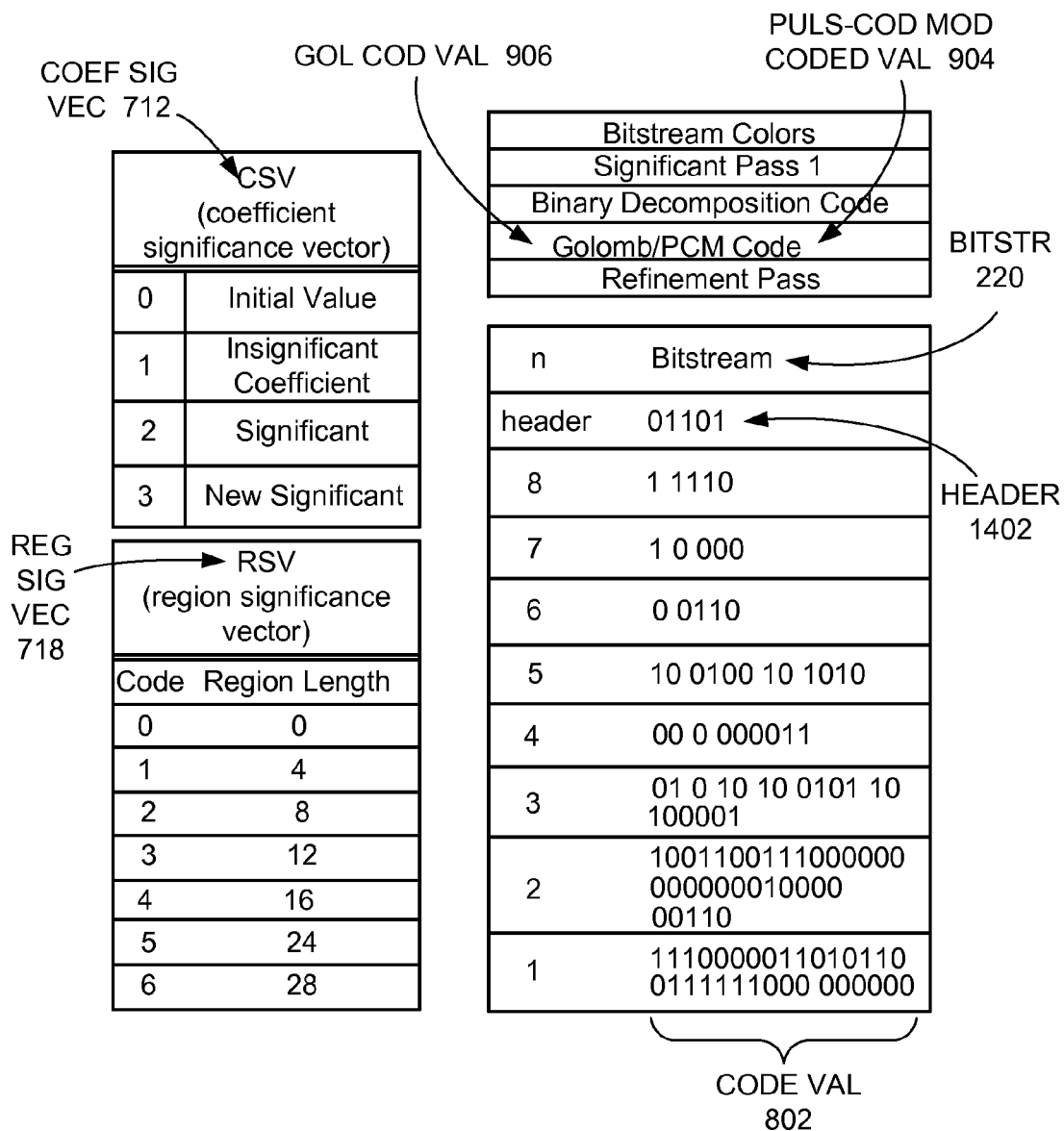
FIG. 14 is an example of the bitstream.

Referring now to FIG. 14, therein is shown an example of the bitstream 220. The example includes generation of the bitstream 220 using the first significant pass module 604 of FIG. 6, the second significant pass module 606 of FIG. 6, and the refinement pass module 608 of FIG. 6. The example depicts descriptions of the coefficient significance vector 712, denoted as CSV, and the region significance vector 718, denoted as RSV.

The second significant pass module 606 can include the binary decomposition using the octave-band form 806 of FIG. 8 and the binary form 808 of FIG. 8. The second significant pass module 606 can include generation of the pulse-code modulation coded value 904 and the Golomb coded value 906.

The coefficient significance vector 712 can include any numerical values. For example, the coefficient significance vector 712 can include numerical values 0, 1, 2, and 3. The coefficient significance vector 712 having a numerical value of 0 can indicate that the coefficient significance vector 712 includes an initial value. The coefficient significance vector 712 having a numerical value of 1 can indicate that the wavelet coefficients 216 of FIG. 2 are insignificant.

The coefficient significance vector 712 having a numerical value of 2 can indicate that the wavelet coefficients 216 are significant. The coefficient significance vector 712 having a numerical value of 3 can indicate that the wavelet coefficients 216 just became significant in the current bitplane 402 of FIG. 4.

The region significance vector 718 can include any numerical values. For example, the region significance vector 718 can include numerical values 0, 1, 2, 3, 4, 5, and 6. The region significance vector 718 having a numerical value of 0 can indicate that the region vector length 720 of FIG. 7 is 0 bit. The region significance vector 718 having a numerical value of 1 can indicate that the region vector length 720 is 4 bits. The region significance vector 718 having a numerical value of 2 can indicate that the region vector length 720 is 8 bits.

The region significance vector 718 having a numerical value of 3 can indicate that the region vector length 720 is 12 bits. The region significance vector 718 having a numerical value of 4 can indicate that the region vector length 720 is 16 bits. The region significance vector 718 having a numerical value of 5 can indicate that the region vector length 720 is 24 bits. The region significance vector 718 having a numerical value of 6 can indicate that the region vector length 720 is 28 bits.

The example depicts the code value 802 in the bitstream 220. The code value 802 can include a header 1402. The header 1402 includes information associated with the bitplane number 704 of FIG. 7 of the most significant bitplane 404 of FIG. 4 of the wavelet coefficients 216 in the lowpass subband 306 of FIG. 3. The header 1402 also includes information associated with a binary value indicating the sign 1202 of FIG. 12 of all of the wavelet coefficients 216 in the lowpass subband 306.

The example shows the bitstream 220 associated with the bitplane number 704 from 8 down to 1. A coding process used to generate the bitstream 220 will be subsequently described in more details in FIG. 15.

Figure 15:
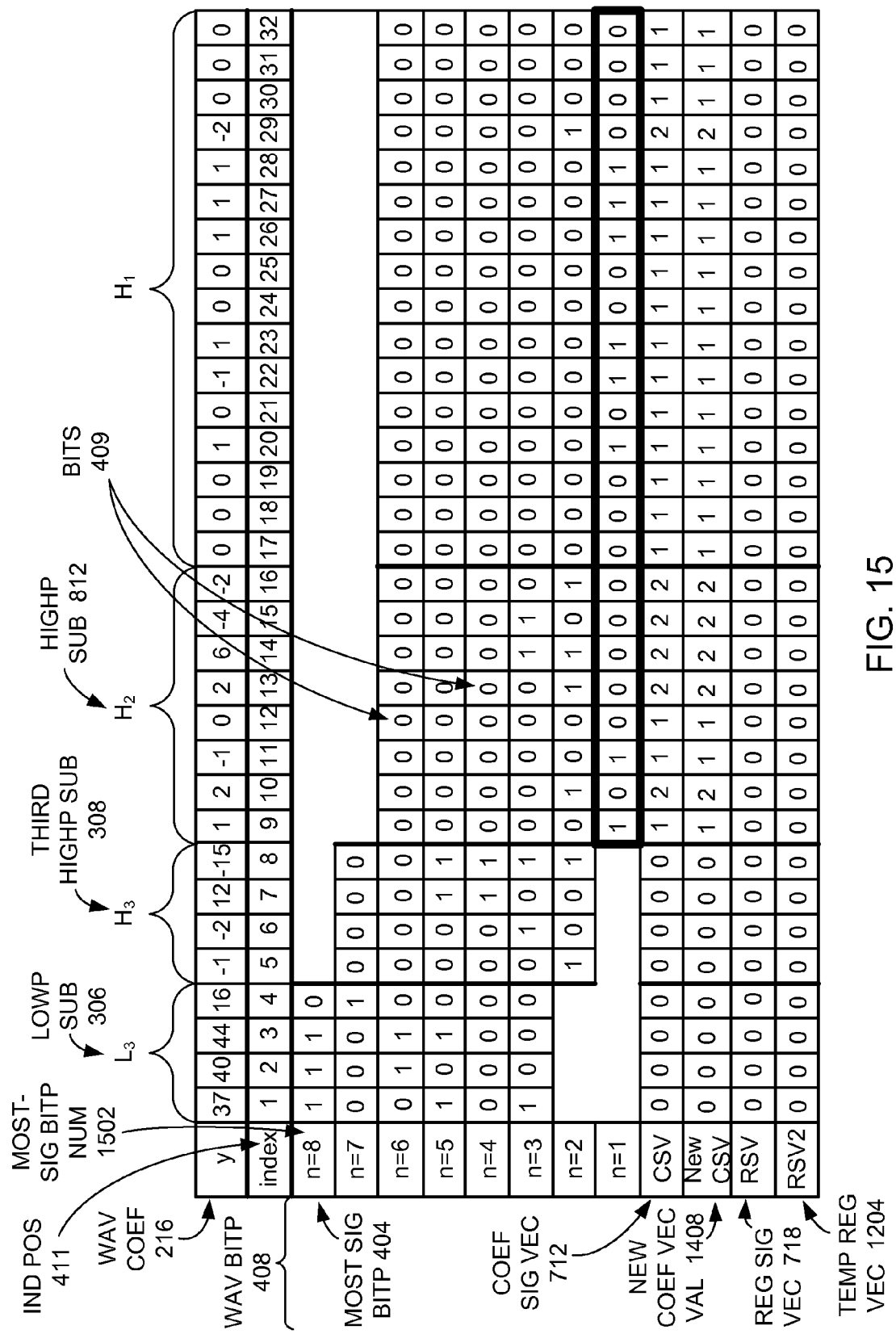
FIG. 15 is a detailed coding example of the bitstream of FIG. 14.

Referring now to FIG. 15, therein is shown a detailed coding example of the bitstream 220 of FIG. 14. The detailed coding example includes an illustrative coding example of BDC for a luma block, such as the wavelet coefficient blocks 218 of FIG. 2 of the luma component 210 of FIG. 2, of size 32×1. A value 32 indicates that there are 32 of the wavelet coefficients 216. A value 1 indicates that there is a 1-D array of the wavelet coefficients 216.

In the detailed coding example, the chroma component 212 of FIG. 2 and a PCM mode are ignored and thus not illustrated. Nevertheless, the embodiments are still described in sufficient detail to enable those skilled in the art to make and use the embodiments of the present invention. Unless otherwise specified, it is understood that a description provided below for the detailed coding example is in a sequential order of steps performed or executed to generate the bitstream 220 of FIG. 2.

Here, y is considered a wavelet transform, denoted as Wavelet, with the three of the wavelet levels 726 of FIG. 7. The wavelet transform can be performed on the raw image blocks 226 of FIG. 2, denoted as x, after offset removal of the raw image blocks 226 by subtracting 64 from the raw image blocks 226 to generate the wavelet coefficient blocks 218, denoted as y. The raw image blocks 226 and the wavelet coefficient blocks 218 can be shown in FIG. 3.

$$y = \text{Wavelet}(x - 64) \quad (11)$$

Coding can start by finding or calculating a most-significant bitplane number 1502, denoted as $W_m$, which is the MSB bitplane number of y (before scaling as in FIG. 4), such as the bitplane number 704 of FIG. 7 of the most significant bitplane 404 of the wavelet coefficients 216 in the wavelet coefficient blocks 218.

$$W_m = \text{ceil}(\log_2 \max|y|) = 6 \quad (12)$$

Then check if all y in the lowpass subband 306, denoted as L3, are positive. If yes, so the sign 1202 of FIG. 12, denoted as POS, =1 to indicate that all of the wavelet coefficients 216 of y in the lowpass subband 306 are positive. Otherwise, the sign 1202 is set to 0. As a result, the header 1402 of FIG. 14 is expressed as follows. FIG. 4 illustrates y and $W_m$.

$$\text{header} = [W_m, \text{POS}] = [01101] \quad (13)$$

A step of the initialization is performed. At this step, the coefficient significance vector 712, denoted as CSV, the region significance vector 718, denoted as RSV, and the temporary region vector 1204, denoted as RSV2, are initialized or assigned to 0. Except for the region significance vector 718 at the index position 411 of 1, denoted as RSV[1], it is initialized or assigned to 1. L3 is initialized as an insignificant partition.

The region vector map 728 of FIG. 7, denoted as RSVmap, can be used as shown in Equation 14 below. The region size 724 of FIG. 7 of the bit regions 710 of FIG. 7 that are insignificant regions can be found or determined as RSVmap[RSV[index]], where index is the index position 411. This map can be used for 64×1 or smaller block sizes with four or three of the wavelet levels 726. For this coding example, only RSVmap={4, 8, 12, 16, 24, 28} may be needed.

$$\text{RSVmap} = \{4, 8, 12, 16, 24, 28, 32, 48, 56, 60\} \quad (14)$$

The lowpass subband 306, denoted as L3, is multiplied by 4, and the third highpass subband 308, denoted as H3, is multiplied by 2. So, $n = W_{m1} = W_m + 2 = 8$ is the bitplane number 704 that is used as a starting point.

A bitstream index 1406 of FIG. 14, denoted as ind, shows or identifies a current bit position in the bitstream 220. A current value of the bitstream index 1406 is ind=6. First 5 bits of the bitstream 220 can be spent or used for the header 1402. It has been noted that a starting value of the bitstream index 1406 in this demo is 1, not 0.

For n=8 in the first significant pass module 604 of FIG. 6, the coefficient significance vector 712, denoted as CSV, can be scanned for 1. No entry of the coefficient significance vector 712 can be 1.

For n=8 in the second significant pass module 606 of FIG. 6, at this stage, the region significance vector 718, denoted as RSV, can be scanned for nonzero values. A binary value of 1 at index=1 is found, which shows an insignificant region of size 4 starting at index=1.

A significance of one of the bit regions 710 at n=8 can be checked. The one of the bit regions 710 is significant so a binary value of 1 can be sent. Since the one of the bit regions 710 has the region size 724 of 4, the one of the bit regions 710 can be coded. Since the one of the bit regions 710 is in the lowpass subband 306, the pulse-code modulation coded value 904 of FIG. 9 can be use. [1110] can be coded to [1110]. It has been noted that need to code the sign 1202 of index=1, 2, and 3 may not need to be coded since POS=1.

The coefficient significance vector 712, denoted as CSV, can be updated based on a significance of the bits 409 in index=1, 2, 3, and 4. A new coefficient vector value 1408, denoted as New CSV, can be assigned to [3 3 3 1]. Since the bits 409 at index=1, 2, and 3 are 1, the coefficient significance vector 712, denoted as CSV, can be set to 3. As for index=4, since one of the bits 409 is 0, the coefficient significance vector 712 can be set to 1 showing an insignificant coefficient.

For n=8 in the refinement pass module 608 of FIG. 6, the coefficient significance vector 712, denoted as CSV, can be scanned for a range of the index. For CSV=2, the refinement pass module 608 can be executed. Since there is no entry of the coefficient significance vector 712, that is 2, this step can be skipped or the refinement pass module 608 can be bypassed.

For n=8 in a final update step, after the refinement pass module 608 is executed, all New CSV[index]==3 can be changed to New CSV[index]=2. This step makes sure that the bits 409 that just became significant in the next bitplanes can be refined.

Then, copy New CSV to CSV and RSV2 to RSV. It has been noted that in the code value 802 of FIG. 8, there is only one of the coefficient significance vector 712, denoted as CSV. Here, New CSV is used to show a transition. Then, move to the next bitplane n=7. The region significance vector 718, denoted as RSV, can be initialized to RSV[5]=1. RSV[1, . . . , 4] are already coded.

For n=7 in the first significant pass module 604, the coefficient significance vector 712, denoted as CSV, can be scanned for 1. Since CSV[4]=1, y[7][4]=1 can be generated and sent to the bitstream 220. Since y is 1, CSV[4]=3 can be set.

For n=7 in the second significant pass module 606, at this stage, the region significance vector 718, denoted as RSV, can be scanned for nonzero values, and an insignificant region or the bit regions 710 that are insignificant can be coded as RSV[5]=1. Since at this region or partition all of the bits 409 are 0, a 0 can be sent. Then, RSV2[5] can be updated to 1.

For n=7 in the refinement pass module 608, the coefficient significance vector 712, denoted as CSV, can be scanned for a range of the index. If CSV=2, the refinement pass module 608 can be performed or executed for index=1, 2, and 3.

For n=7 in the final update step, after the refinement pass module 608 is executed, all New CSV[index]=3 can be changed to New CSV[index]=2. This step makes sure that the bits 409 that just became significant in the next bitplanes can be refined.

Then, copy New CSV to CSV and RSV2 to RSV. Then, reset RSV2 to zero and move to the next bitplane n=6. Since RSV[5]=1, set RSV[5]=6 to cover all highpass coefficients, that is, for index=5, 6, . . . , 32.

For n=6 in the first significant pass module 604, the coefficient significance vector 712, denoted as CSV, can be scanned for 1. No entry of CSV is 1.

For n=6 in the second significant pass module 606, at this stage, the region significance vector 718, denoted as RSV, can be scanned for nonzero values. Only RSV[5] can be coded. Since all of the bits 409 are 0, a 0 can be sent. Then, RSV2[5] can be updated as RSV2[5]=6.

For n=6 in the refinement pass module 608, the coefficient significance vector 712, denoted as CSV, can be scanned for a range of the index. If CSV=2, the refinement pass module 608 can be performed or executed for index=1, 2, 3, and 4.

For n=6 in the final update step, after the refinement pass module 608 is executed, all New CSV[index]==3 can be changed to New CSV[index]=2. This step makes sure that the bits 409 that just became significant in the next bitplanes can be refined. Then, copy New CSV to CSV and RSV2 to RSV. Then, reset RSV2 to zero and move to the next bitplane n=5.

For n=5 in the first significant pass module 604, the coefficient significance vector 712, denoted as CSV, can be scanned for 1. No entry of CSV is 1.

For n=5 in the second significant pass module 606, at this stage, the region significance vector 718, denoted as RSV, can be scanned for nonzero values or insignificant regions. Since RSV[5]=6, so one of the bit regions 710, at the index position 411 from 5 to 32, can be coded. The one of the bit regions 710 is significant, so send a 1 and decompose the one of the bit regions 710 into two of the bit regions 710 using an octave decomposition with the octave-band form 806 of FIG. 8. The two of the bit regions 710 or new regions are at the index position 411 from 5 to 8 and from 9 to 32.

Then, significance of the new regions can be coded together. Since a left region of the new regions is significant, and a right region of the new regions is not significant, a VLC table previously described in FIG. 9 can be used and send a 0. Then, the bits 409 in the left region at the index position 411 from 5 to 8 can be coded. A Golomb code given in FIG. 10 can be used. [0011] can be coded to [0100].

Then, the sign 1202 of index=7 and 8 that are significant can be coded. The code value 802 can be [1 0], where 1 is for positive and 0 is for negative. The coefficient significance vector 712, denoted as CSV, can be updated based on significance of the bits 409 in the index position 411 from 5 to 8. New CSV=[1 1 3 3]. The right region is insignificant so set RSV2[9]=5.

For n=5 in the refinement pass module 608, the coefficient significance vector 712, denoted as CSV, can be scanned for a range of the index. If CSV=2, the refinement pass module 608 can be performed or executed for index=1, 2, 3, and 4.

For n=5 in the final update step, after the refinement pass module 608 is executed, all New CSV[index]=3 can be changed to New CSV[index]=2. Then, copy New CSV to CSV and RSV2 to RSV. Then, reset RSV2 to zero and move to the next bitplane n=4.

For n=4 in the first significant pass module 604, the coefficient significance vector 712, denoted as CSV, can be scanned for 1. CSV for index=5 and 6 is 1 so check if CSV becomes significant. Since CSV does not become significant, so just send [0 0].

For n=4 in the second significant pass module 606, at this stage, the region significance vector 718, denoted as RSV, can be scanned for nonzero values. Since RSV[9]=5, so only one of the bit regions 710, at the index position 411 from 9 to 32, can be coded. All of the bits 409 are zero, so send a 0 and set RSV2[9]=5.

For n=4 in the refinement pass module 608, the coefficient significance vector 712, denoted as CSV, can be scanned for a range of the index. If CSV=2, the refinement pass module 608 can be performed or executed for index=1, 2, 3, 4, 7, and 8 for updated values of CSV.

For n=4 in the final update step, after the refinement pass module 608 is executed, all New CSV[index]=3 can be changed to New CSV[index]=2. Then, copy New CSV to CSV and RSV2 to RSV. Then, reset RSV2 to zero and move to the next bitplane n=3.

For n=3 in the first significant pass module 604, the coefficient significance vector 712, denoted as CSV, can be scanned for 1. CSV[index]=1 at index=5 and 6, so send y[3][index]=[0 1] to the bitstream 220. Since y[3][6]=1, set CSV[6]=3 and send the sign 1202 of 0 in this case since the sign 1202 is negative.

For n=3 in the second significant pass module 606, at this stage, the region significance vector 718, denoted as RSV, can be scanned for nonzero values or insignificant regions. Since RSV[9]=5, so one of the bit regions 710, at the index position 411 from 9 to 32, can be coded. Since the one of the bit regions 710 is significant, so send a 1 and decompose the one of the bit regions 710 into two of the bit regions 710 using the octave decomposition with the octave-band form 806. The two of the bit regions 710 or new regions are at the index position 411 from 9 to 16 and from 17 to 32.

Then, significance of the new regions can be coded together. Since a left region of the new regions is significant, and a right region of the new regions is not significant, the variable-length code (VLC) table previously described in FIG. 9 can be used and send a 0. The right region is insignificant, so set RSV2[17]=4.

For n=3 in the second significant pass module 606, the bits 409 in the left region at the index position 411 from 9 to 16 can be coded. First, the binary decomposition using the binary form 808 of FIG. 8 can be used to decompose the bits 409 into two of the equal regions 902 of FIG. 9 at the index position 411 from 9 to 12 and from 13 to 16.

Then, significance of the equal regions 902 can be coded together. Since a left region of the equal regions 902 is insignificant and a right region of the equal regions 902 is not insignificant, the VLC table previously described in FIG. 9 can be used and send a binary value of 10. Then, the left region at the index position 411 from 9 to 12 can be coded. The Golomb code given in FIG. 10 can be used. [0110] can be coded to [0101].

Then, the sign 1202 of index=14 and 15 that are significant can be coded. The code value 802 can be [1 0], where 1 is for positive and 0 is for negative. The coefficient significance vector 712, denoted as CSV, can be updated based on significance of the bits 409 in the index position 411 from 13 to 16. New CSV=[1 3 3 1]. The right region is insignificant so set RSV2[9]=1. The right region is insignificant so set RSV2[9]=1.

For n=3 in the refinement pass module 608, the coefficient significance vector 712, denoted as CSV, can be scanned for a range of the index. If CSV=2, the refinement pass module 608 can be performed or executed for index=1, 2, 3, 4, 7, and 8.

For n=3 in a first final update step, after the refinement pass module 608 is executed, all New CSV[index]=3 can be changed to New CSV[index]=2. Then, copy New CSV to CSV and RSV2 to RSV. Then, reset RSV2 to zero and move to the next bitplane n=2.

For n=3 in a second final update step, at the bitplane number 704 n=3, the code value 802 can be prepared or generated in order not to use the second significant pass module 606 for the last 2 bitplanes in the luma component 210. To do that, all zero entries of the coefficient significance vector 712, denoted as CSV, can be changed to 1. Thus, those bits can go or pass to the first significant pass module 604.

The coefficient significance vector 712, denoted as CSV, for the lowpass subband 306 can be set to zero since it is out of range. The region significance vector 718, denoted as RSV, can be reset to 0 so that the second significant pass module 606 can be skipped. Then, move to the next bitplane n=2.

For n=2 in the first significant pass module 604, the coefficient significance vector 712, denoted as CSV, can be scanned for 1. Since CSV[index]=1, send y[2][index] to the bitstream 220. Since y[2][index]=1, set CSV[index]=3 and send the sign 1202.

For n=2 in the second significant pass module 606, at this bitplane, the second significant pass module 606 can be skipped. For n=2 in the refinement pass module 608, the coefficient significance vector 712, denoted as CSV, can be scanned. If CSV=2, the refinement pass module 608 can be performed or executed.

For n=2 in the final update step, after the refinement pass module 608 is executed, all New CSV[index]=3 can be changed to New CSV[index]=2. Then, copy New CSV to CSV. Then, move to the next bitplane n=1. Then, for this bitplane, set the coefficient significance vector 712, denoted as CSV, to zero for the third highpass subband 308, denoted as H3.

For n=1 in the first significant pass module 604, the coefficient significance vector 712, denoted as CSV, can be scanned for 1. Since CSV[index]=1, send y[1][index] to the bitstream 220. Since y[1][index]=1, set CSV[index]=3 and send the sign 1202.

For n=1 in the second significant pass module 606, at this bitplane, the second significant pass module 606 can be skipped. For n=1 in the refinement pass module 608, if CSV=2, the refinement pass module 608 can be performed or executed. This step is the last step of coding. A number of the bits 409 spent or generated is 125.

Functions or operations of the image processing system 100 of FIG. 1 as described above can be implemented using modules. The functions or the operations of the image processing system 100 can be implemented in hardware, software, or a combination thereof.

The image processing system 100 is described with module functions or order as an example. The modules can be partitioned differently. Each of the modules can operate individually and independently of the other modules. Furthermore, data generated in one module can be used by another module without being directly coupled to each other.

The physical transformation of generating the bitstream 220 based on the encoded block 222 of FIG. 2 for decoding into the display image 248 of FIG. 2 to display on the display device 250 of FIG. 2 results in movement in the physical world, such as people using the encoding module 232 of FIG. 2 and the decoding module 234 of FIG. 2 based on the operation of the image processing system 100. As the movement in the physical world occurs, the movement itself creates additional information that is converted back to the raw image blocks 226 from the imaging device 208 of FIG. 2 to generate the code value 802 based on the region significance vector 718 of the bit regions 710 for the continued operation of the image processing system 100 and to continue the movement in the physical world.

It has been discovered that the code value 802 generated based on the region significance vector 718 in the wavelet bitplanes 408 of the wavelet coefficient blocks 218 provides visually lossless compression for images and videos for rates of 3 bps or lower in order to reduce bandwidth demands of various image processing modules and memory.

It has also been discovered that the code value 802 generated based on the significant coefficient 702 of FIG. 7 provides visually lossless compression for rates of 3 bps or lower thereby reducing bandwidths required for processing images. The significant coefficient 702 includes a non-zero value.

It has further been discovered that the code value 802 generated by partitioning the significant region 804 of FIG. 8 into the lowpass subband 306 and the highpass subbands 812 provides visually lossless compression for rates of 3 bps or lower thereby reducing bandwidths required for processing images. The code value 802 is generated based on the octave-band form 806 or the binary form 808 and using a binary value from a set of {0, 10, 11}.

It has further been discovered that the code value 802 generated by partitioning the significant region 804 into two of the equal regions 902 and generating the pulse-code modulation coded value 904 for one of the equal regions 902 provides visually lossless compression for rates of 3 bps or lower thereby reducing bandwidths required for processing images. The code value 802 is generated by partitioning the significant region 804 in the lowpass subband 306 based on the binary form 808. The pulse-code modulation coded value 904 is generated for one of the equal regions 902 that is significant.

It has further been discovered that the code value 802 generated by partitioning the significant region 804 into two of equal regions 902 and coding the equal regions 902 together based on significance of the equal regions 902 provides visually lossless compression for rates of 3 bps or lower thereby reducing bandwidths required for processing images. The equal regions 902 are coded together based on a binary value from a set of {0, 10, 11}.

Referring now to FIG. 16, therein is shown another example of the wavelet coefficients 216 of the 3-level wavelets. A multilevel wavelet transform (WT) can be generated by cascading single-level wavelet decompositions.

In this example, a three-level wavelet transform can be used with a first decomposition module 1602, a second decomposition module 1604, and a third decomposition module 1606 to generate wavelet subbands $Y_{H1}$, $Y_{H2}$, $Y_{H3}$, and $Y_{L3}$. The wavelet subband $Y_{L3}$ can correspond to the lowpass subband 306. The wavelet subbands $Y_{H1}$, $Y_{H2}$, and $Y_{H3}$ can correspond to the first highpass subband 312, the second highpass subband 310, and the third highpass subband 308, respectively.

Figure 17:
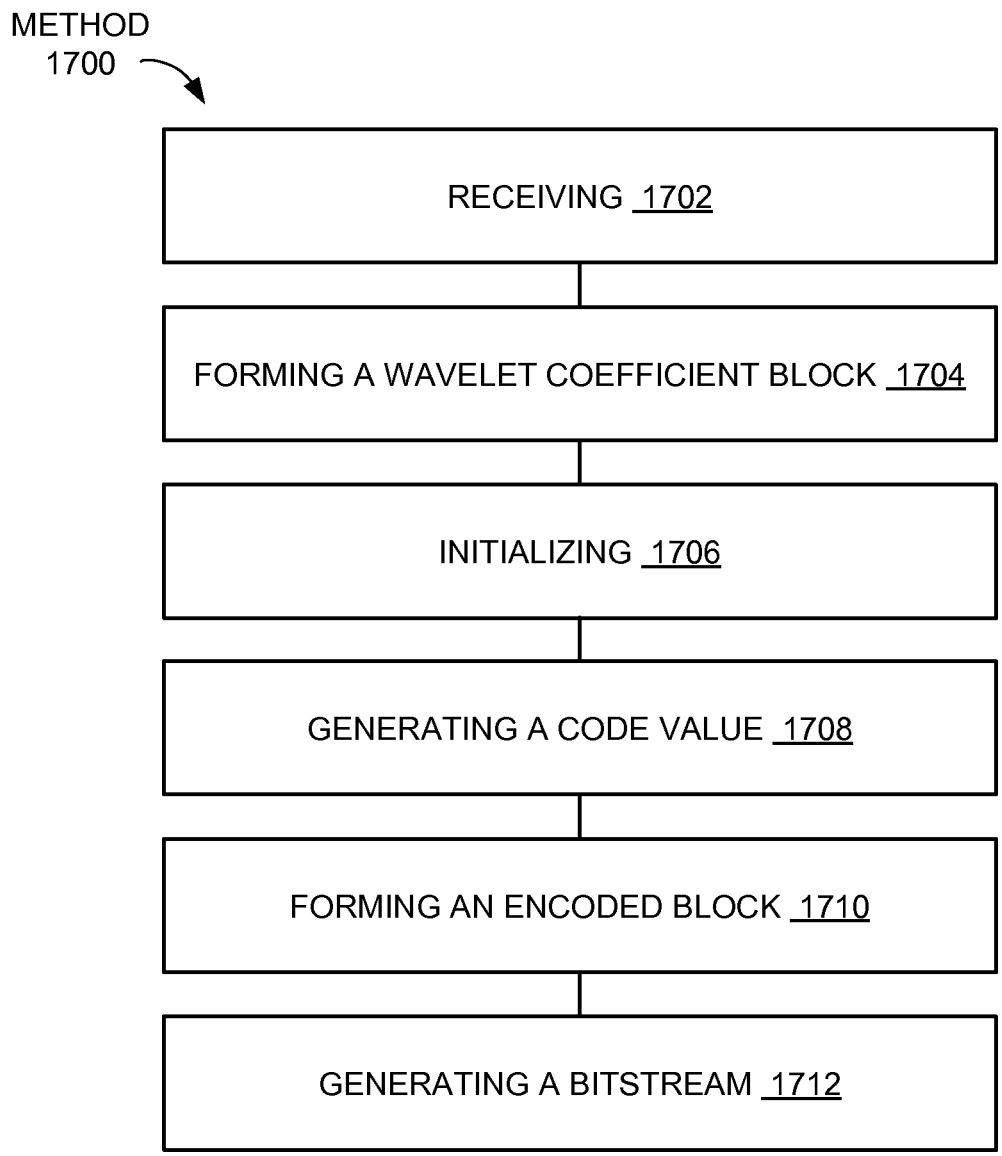
FIG. 17 is a flow chart of a method of operation of an image processing system in a further embodiment of the present invention.

Referring now to FIG. 17, therein is shown a flow chart of a method 1700 of operation of an image processing system in a further embodiment of the present invention. The method 1700 includes: receiving a raw image block of a source image from an imaging device in a block 1702; forming a wavelet coefficient block by performing a wavelet transform operation on the raw image block in a block 1704; initializing a region significance vector based on the wavelet coefficient block in a block 1706; generating a code value based on the region significance vector at an index position of a bit region in a wavelet bitplane of the wavelet coefficient block in a block 1708; forming an encoded block based on the code value in a block 1710; and generating a bitstream based on the encoded block for decoding into a display image to display on a display device in a block 1712.

Thus, it has been discovered that the image processing system 100 of FIG. 1 of the embodiments of the present invention furnish important and heretofore unknown and unavailable solutions, capabilities, and functional aspects for an image processing system with binary decomposition. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
    receiving a raw image block of a source image from an imaging device;
    forming a wavelet coefficient block by performing a wavelet transform operation on the raw image block;
    initializing a region significance vector based on the wavelet coefficient block;
    generating a code value based on the region significance vector at an index position of a bit region in a wavelet bitplane of the wavelet coefficient block, wherein the bit region includes a region size with a predetermined minimum value, the region significance vector includes a region vector length, the region vector length is determined by the region size and a bitplane length of the wavelet bitplane;
    forming an encoded block based on the code value; and
    generating a bitstream based on the encoded block for decoding into a display image to display on a display device.

2. The method as claimed in claim 1 wherein generating the code value includes generating the code value based on a significant coefficient, wherein the significant coefficient is a wavelet coefficient in the wavelet coefficient block.

3. The method as claimed in claim 1 wherein generating the code value includes generating the code value by partitioning a significant region into a lowpass subband and a highpass subband and partitioning the highpass subband into one or more highpass subbands based on an octave-band form, wherein the significant region covering more than a wavelet subband for a wavelet coefficient and having the region size greater than 4 bits.

4. The method as claimed in claim 1 wherein generating the code value includes generating the code value by partitioning a significant region in a wavelet subband into two equal regions based on a binary form and by generating a Golomb coded value for one of the equal regions having a size of 4 bits.

5. The method as claimed in claim 1 wherein generating the code value includes generating the code value by partitioning a significant region into two equal regions and coding the equal regions together based on significance of the equal regions.

6. A method of operation of an image processing system comprising:
    receiving a raw image block of a source image from an imaging device;
    forming a wavelet coefficient block by performing a wavelet transform operation on the raw image block;
    initializing a region significance vector based on the wavelet coefficient block;

generating a code value based on the region significance vector at an index position of a bit region in a wavelet bitplane of the wavelet coefficient block, wherein the region significance vector is for determining significance of the bit region, the bit region includes a region size with a predetermined minimum value, the region significance vector includes a region vector length, and the region vector length is determined by the region size and a bitplane length of the wavelet bitplane;

forming an encoded block based on the code value; and generating a bitstream based on the encoded block for decoding into a display image to display on a display device.

7. The method as claimed in claim 6 wherein generating the code value includes generating the code value based on a significant coefficient, wherein the significant coefficient is a wavelet coefficient in the wavelet coefficient block and the wavelet coefficient includes a non-zero value.

8. The method as claimed in claim 6 wherein generating the code value includes generating the code value by partitioning a significant region into a lowpass subband and a highpass subband and partitioning the highpass subband into one or more highpass subbands based on an octave-band form and using a binary value from a set of {0, 10, 11}, wherein the significant region covering more than a wavelet subband for a wavelet coefficient and having the region size greater than 4 bits.

9. The method as claimed in claim 6 wherein generating the code value includes generating the code value by partitioning a significant region in a wavelet subband into two equal regions based on a binary form and generating a pulse-code modulation coded value for one of the equal regions that is significant.

10. The method as claimed in claim 6 wherein generating the code value includes generating the code value by partitioning a significant region into two equal regions and coding the equal regions together based on significance of the equal regions using a binary value from a set of {0, 10, 11}.

11. An image processing system comprising:

a pre-processing module for receiving a raw image block of a source image from an imaging device;

a wavelet transform module, coupled to the pre-processing module, for forming a wavelet coefficient block by performing a wavelet transform operation on the raw image block; and an encoding module, coupled to the wavelet transform module, for initializing a region significance vector based on the wavelet coefficient block, for generating a code value based on the region significance vector at an index position of a bit region in a wavelet bitplane of the wavelet coefficient block, wherein the bit region includes a region size with a predetermined minimum value, the region significance vector includes a region vector length, the region vector length is determined by the region size and a bitplane length of the wavelet bitplane, for forming an encoded block based on the code value, and for generating a bitstream based on the encoded block for decoding into a display image to display on a display device.

12. The system as claimed in claim 11 wherein the encoding module is for generating the code value based on a significant coefficient, wherein the significant coefficient is a wavelet coefficient in the wavelet coefficient block.

13. The system as claimed in claim 11 wherein the encoding module is for generating the code value by partitioning a significant region into a lowpass subband and a highpass subband and partitioning the highpass subband into one or more highpass subbands based on an octave-band form, wherein the significant region covering more than a wavelet subband for a wavelet coefficient and having the region size greater than 4 bits.

14. The system as claimed in claim 11 wherein the encoding module is for generating the code value by partitioning a significant region in a wavelet subband into two equal regions based on a binary form and by generating a Golomb coded value for one of the equal regions having a size of 4 bits.

15. The system as claimed in claim 11 wherein the encoding module is for generating the code value by partitioning a significant region into two equal regions and coding the equal regions together based on significance of the equal regions.

16. The system as claimed in claim 11 wherein the encoding module is for generating the code value based on the region significance vector, wherein the region significance vector is for determining significance of the bit region.

17. The system as claimed in claim 16 wherein the encoding module is for generating the code value based on a significant coefficient, wherein the significant coefficient is a wavelet coefficient in the wavelet coefficient block and the wavelet coefficient includes a non-zero value.

18. The system as claimed in claim 16 wherein the encoding module is for generating the code value by partitioning a significant region into a lowpass subband and a highpass subband and partitioning the highpass subband into one or more highpass subbands based on an octave-band form and using a binary value from a set of {0, 10, 11}, wherein the significant region covering more than a wavelet subband for a wavelet coefficient and having the region size greater than 4 bits.

19. The system as claimed in claim 16 wherein the encoding module is for generating the code value by partitioning a significant region in a wavelet subband into two equal regions based on a binary form and generating a pulse-code modulation coded value for one of the equal regions that is significant.

20. The system as claimed in claim 16 wherein the encoding module is for generating the code value by partitioning a significant region into two equal regions and coding the equal regions together based on significance of the equal regions using a binary value from a set of {0, 10, 11}.

* * * * *